(12) United States Patent
Shinada et al.

(10) Patent No.: US 9,148,813 B2
(45) Date of Patent: Sep. 29, 2015

(54) COMMUNICATION QUALITY MEASURING APPARATUS AND COMMUNICATION QUALITY MEASURING METHOD

(71) Applicant: FUJITSU LIMITED, Kawasaki-shi, Kanagawa (JP)

(72) Inventors: Yuki Shinada, Saitama (JP); Hiromitsu Kawai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 13/971,367

(22) Filed: Aug. 20, 2013

(65) Prior Publication Data

US 2014/0135043 A1    May 15, 2014

(30) Foreign Application Priority Data

Nov. 14, 2012  (JP) ................. 2012-250678

(51) Int. Cl.
| | |
|---|---|
| *H04W 24/00* | (2009.01) |
| *H04W 24/10* | (2009.01) |
| H04W 24/08 | (2009.01) |
| H04W 64/00 | (2009.01) |

(52) U.S. Cl.
CPC .............. *H04W 24/10* (2013.01); *H04W 24/08* (2013.01); *H04W 64/00* (2013.01)

(58) Field of Classification Search
CPC ..................................................... H04W 24/02
USPC .................................... 455/457, 67.11, 67.13
See application file for complete search history.

(56) References Cited

U.S. PATENT DOCUMENTS

| | | | | |
|---|---|---|---|---|
| 8,244,227 | B2* | 8/2012 | Suzuki ..................... | 455/414.2 |
| 2007/0054624 | A1* | 3/2007 | Kashiwagi ................ | 455/67.13 |
| 2008/0153470 | A1 | 6/2008 | Ohsako et al. | |
| 2011/0294436 | A1* | 12/2011 | Ono et al. ................. | 455/67.11 |
| 2012/0231813 | A1* | 9/2012 | Nakano ..................... | 455/456.1 |

FOREIGN PATENT DOCUMENTS

| | | |
|---|---|---|
| JP | 2003-249887 | 9/2003 |
| JP | 2004-312528 | 11/2004 |
| JP | 2008-160310 | 7/2008 |
| JP | 2010062783 A * | 3/2010 |
| JP | 2010-177945 | 8/2010 |
| JP | 2011109417 A * | 6/2011 |
| WO | 2009011065 | 1/2009 |

* cited by examiner

*Primary Examiner* — Charles Shedrick
(74) *Attorney, Agent, or Firm* — Fujitsu Patent Center

(57) ABSTRACT

A communication quality measuring apparatus includes a calculating unit, a specifying unit, and an associating unit. The calculating unit collects information that is used to calculate the communication quality of wireless communication from a base station that performs wireless communication with a mobile station and calculates the communication quality by using the information. The specifying unit collects location information from a measuring device that measures the location information related to the mobile station and specifies a mobile station area that is an area in which the mobile station is located by using the location information. The associating unit associates the communication quality calculated by the calculating unit with each of the mobile station areas specified by the specifying unit.

7 Claims, 21 Drawing Sheets

| MOBILE STATION IDENTIFIER | MEASURE-MENT TIME | TRANSMISSION SPEED (kbps) | MAXIMUM COMMUNICATION SPEED (Mbps) |
|---|---|---|---|
| aaa | 12:05:36 | 300 | 1.5 |
| aaa | 12:27:22 | 650 | 1.5 |
| bbb | 12:27:25 | 120 | 1.5 |
| bbb | 12:34:01 | 100 | 1.5 |
| aaa | 13:11:22 | 384 | 1.5 |
| ccc | 13:21:48 | 120 | 1.5 |
| ... | ... | ... | ... |

132

| AREA NUMBER | LATITUDE | LONGITUDE |
|---|---|---|
| A1 | 35.730541xx TO 35.730641xx | 139.712941yy TO 139.713041yy |
| A2 | 35.730541xx TO 35.730641xx | 139.713041yy TO 139.713141yy |
| A3 | 35.730541xx TO 35.730641xx | 139.713141yy TO 139.713241yy |
| A4 | 35.730641xx TO 35.730741xx | 139.712941yy TO 139.713041yy |
| A5 | 35.730641xx TO 35.730741xx | 139.713041yy TO 139.713141yy |
| A6 | 35.730641xx TO 35.730741xx | 139.713141yy TO 139.713241yy |
| A7 | 35.730741xx TO 35.730841xx | 139.712941yy TO 139.713041yy |
| A8 | 35.730741xx TO 35.730841xx | 139.713041yy TO 139.713141yy |
| A9 | 35.730741xx TO 35.730841xx | 139.713141yy TO 139.713241yy |
| ... | ... | ... |

133

| MOBILE STATION IDENTIFIER | MEASUREMENT TIME | LATITUDE | LONGITUDE | AREA NUMBER |
|---|---|---|---|---|
| aaa | 12:21:33 | 35.730645xx | 139.712945yy | A4 |
| aaa | 12:26:23 | 35.730545xx | 139.712945yy | A1 |
| aaa | 12:28:35 | 35.730545xx | 139.712945yy | A1 |
| bbb | 12:52:21 | 35.730545xx | 139.713045yy | A2 |
| bbb | 13:42:11 | 35.730545xx | 139.713145yy | A3 |
| bbb | 13:45:18 | 35.730545xx | 139.713145yy | A3 |
| ... | ... | ... | ... | ... |

| AREA NUMBER | MEASUREMENT TIME | TRANSMISSION SPEED (kbps) | NUMBER OF SAMPLES |
|---|---|---|---|
| A1 | 12:27:22 | 650 | 1 |
| A2 | 12:05:36 | 300 | 4 |
| A3 | – | – | 0 |
| … | … | … | … |

134

MOBILE STATION     BASE STATION

FIG.14

| MOBILE STATION IDENTIFIER | MEASUREMENT TIME | COMMUNICATION TRAFFIC VOLUME (kbyte) |
|---|---|---|
| aaa | 12:05:36 | 3 |
| aaa | 12:27:22 | 6.5 |
| aaa | 12:27:25 | 1.2 |
| bbb | 12:34:01 | 1 |
| bbb | 12:40:01 | 5 |
| aaa | 13:11:22 | 3.8 |
| ccc | 13:21:48 | 1.2 |
| ccc | 13:24:50 | 2 |
| ... | ... | ... |

| MOBILE STATION IDENTIFIER | MEASUREMENT TIME | LATITUDE | LONGITUDE | MOVING RANGE IDENTIFIER | DIAGRAM AREA IDENTIFIER |
|---|---|---|---|---|---|
| aaa | 12:05:36 | 35.730541xx | 139.71294yy | S1 | P |
| aaa | 12:27:22 | 35.730543xx | 139.71296yy | E1 | P |
| aaa | 12:27:25 | 35.730543xx | 139.71296yy | S2 | |
| aaa | 13:11:22 | 35.730643xx | 139.71297yy | E2 | |
| bbb | 12:34:01 | 35.730650xx | 139.71297yy | S1 | Q |
| bbb | 12:40:01 | 35.730660xx | 139.71297yy | E1 | |
| ccc | 13:21:48 | 35.730645xx | 139.71299yy | S1 | P |
| ccc | 13:24:50 | 35.730690xx | 139.71299yy | E1 | |
| ... | ... | ... | ... | ... | ... |

| MOBILE STATION IDENTIFIER | MEASUREMENT TIME | LATITUDE | LONGITUDE | MOVING RANGE IDENTIFIER | DIAGRAM AREA IDENTIFIER | COMMUNICATION TRAFFIC VOLUME (kbyte) | COMMUNICATION TRAFFIC VOLUME DENSITY (kbyte/m²) |
|---|---|---|---|---|---|---|---|
| aaa | 12:05:36 | 35.730541xx | 139.71294yy | S1 | P | 3.5 | 5000 |
| aaa | 12:27:22 | 35.730543xx | 139.71296yy | E1 | | | |
| aaa | 12:27:25 | 35.730543xx | 139.71296yy | S2 | P | 2.6 | 2500 |
| aaa | 13:11:22 | 35.730643xx | 139.71297yy | E2 | | | |
| bbb | 12:34:01 | 35.730650xx | 139.71297yy | S1 | Q | 4 | 1000 |
| bbb | 12:40:01 | 35.730660xx | 139.71297yy | E1 | | | |
| ccc | 13:21:48 | 35.730645xx | 139.71299yy | S1 | P | 0.8 | 500 |
| ccc | 13:24:50 | 35.730690xx | 139.71299yy | E1 | | | |
| ... | ... | ... | ... | ... | ... | ... | ... |

REFERENCE DIAGRAM AREA

P
DIAGRAM AREA

COMMUNICATION QUALITY MEASURING APPARATUS AND COMMUNICATION QUALITY MEASURING METHOD

CROSS-REFERENCE TO RELATED APPLICATION

This application is based upon and claims the benefit of priority of the prior Japanese Patent Application No. 2012-250678, filed on Nov. 14, 2012, the entire contents of which are incorporated herein by reference.

FIELD

The embodiments discussed herein are related to a communication quality measuring apparatus and a communication quality measuring method.

BACKGROUND

In recent years, various services have been provided by using wireless communication between mobile stations and base stations. However, if the effect of the environment in a communication area or the effect of noise is large, the communication quality of wireless communication between mobile stations and base stations decreases, and thus it may possibly be difficult to meet a predetermined communication quality.

To cope with the above situation, various technologies have been proposed that measures the communication quality of wireless communication between mobile stations and base stations in order to manage the communication quality for each communication area in which a mobile station is located. For example, a mobile station measures the transmission speed that corresponds to the communication quality of the wireless communication with a base station, and furthermore, the transmission speed is associated with each communication area that is specified by location information obtained by using a global positioning system (GPS) function. Furthermore, there is also a conventional technology in which the Radio Network Controller (RNC) that controls a base station measures the number of mobile stations under the base station and calculates, as the communication quality of a communication area, the communication rate that is obtained by dividing a fixed value of the transmission speed that is previously allocated to a communication area by the number of mobile stations.

Patent Document 1: Japanese Laid-open Patent Publication No. 2003-249887
Patent Document 2: Japanese Laid-open Patent Publication No. 2008-160310

However, with the conventional technology, there is a problem in that it is difficult to accurately measure the communication quality for each area in which a mobile station is located while avoiding an increase in the processing load of the mobile station.

Specifically, with the conventional technology in which a mobile station measures the transmission speed and the transmission speed is associated with each communication area, in addition to the processing load of the wireless communication with the base station, there is also a processing load for measuring the transmission speed; therefore, the processing load of the mobile station may increase.

Furthermore, with the conventional technology in which the RNC calculates the communication rate, an increase in the processing load of a mobile station can be avoided; however, because the communication rate is calculated as the communication quality by using the fixed value of the transmission speed, the accuracy of the calculated communication quality is possibly not maintained.

SUMMARY

According to an aspect of an embodiment, a communication quality measuring apparatus includes a calculating unit that collects, from a base station that performs wireless communication with a mobile station, information used to calculate communication quality of the wireless communication and that calculates the communication quality by using the information; a specifying unit that collects location information from a measuring device, which measures the location information related to the mobile station, and that specifies, by using the location information, a mobile station area that is an area in which the mobile station is located; and an associating unit that associates the communication quality calculated by the calculating unit with each of the mobile station areas specified by the specifying unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a schematic diagram illustrating an example of a communication quality managing unit according to the second embodiment;

FIG. 15 is a schematic diagram illustrating an example of a mobile station area managing unit according to the second embodiment;

FIG. 16 is a schematic diagram illustrating an example of a communication quality distribution managing unit according to the second embodiment;

DESCRIPTION OF EMBODIMENTS

Preferred embodiments of the present invention will be explained with reference to accompanying drawings.

The present invention is not limited to these embodiments.

[a] First Embodiment

Figure 1:
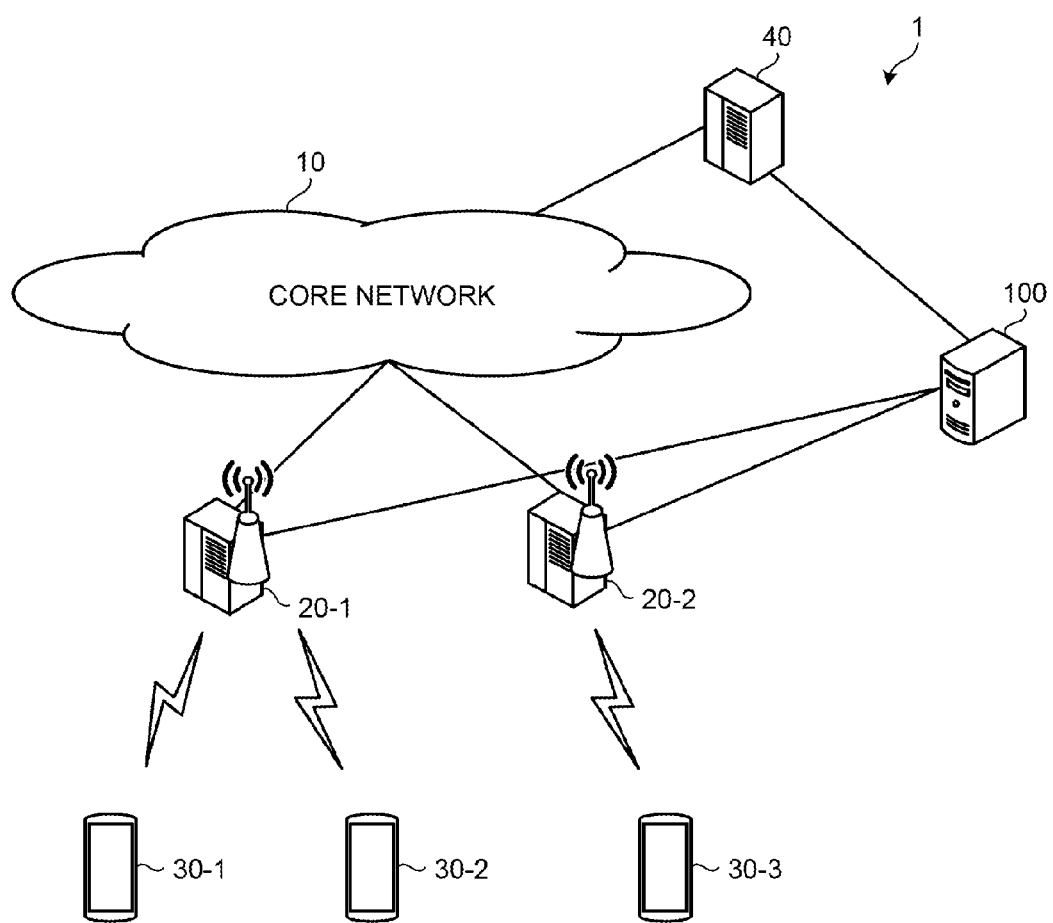
FIG. 1 is a schematic diagram illustrating the overall configuration of a communication system that includes a communication quality measuring apparatus according to a first embodiment.

FIG. 1 is a schematic diagram illustrating the overall configuration of a communication system that includes a communication quality measuring apparatus according to a first embodiment. As illustrated in FIG. 1, a communication system 1 includes a core network 10, base stations 20-1 and 20-2, mobile stations 30-1 to 30-3, a location information measuring device 40, and a communication quality measuring apparatus 100. The base stations 20-1 and 20-2 are connected to the core network 10, which is a higher level network, by using a wired connection. The mobile stations 30-1 to 30-3 perform two-way wireless communication with the base stations 20-1 and 20-2. Furthermore, the location information measuring device 40 is connected to the core network 10, which is a higher level network, by using a wired connection. The location information measuring device 40 measures, by using a GPS function, location information related to the mobile stations 30-1 to 30-3 via the core network 10 and the base stations 20-1 and 20-2. The communication quality measuring apparatus 100 is connected to the base stations 20-1 and 20-2 and the location information measuring device 40 by using a wired connection.

The communication quality measuring apparatus 100 collects, from the base stations 20-1 and 20-2, information that is used to calculate the communication quality of wireless communication between the base stations 20-1 and 20-2 and the mobile stations 30-1 to 30-3 (hereinafter, referred to where appropriate as "wireless communication"). Then, the communication quality measuring apparatus 100 calculates the communication quality of wireless communication by using the collected information. The communication quality of the wireless communication is, for example, the transmission speed or the communication traffic volume of data exchanged during the wireless communication. The communication quality of wireless communication is stored in the communication quality measuring apparatus 100.

Furthermore, the communication quality measuring apparatus 100 collects location information on the mobile stations 30-1 to 0-3 from the location information measuring device 40. Then, by using the collected location information, the communication quality measuring apparatus 100 specifies the areas in which each of the mobile stations 30-1 to 30-3 is located. These areas, in which each of the mobile stations 30-1 to 30-3 is located, are stored in the communication quality measuring apparatus 100.

Then, the communication quality measuring apparatus 100 associates communication qualities with the areas in which the mobile stations 30-1 to 30-3 are located. The communication qualities associated with the areas in which the mobile stations 30-1 to 30-3 are located are stored in the communication quality measuring apparatus 100.

Figure 2:
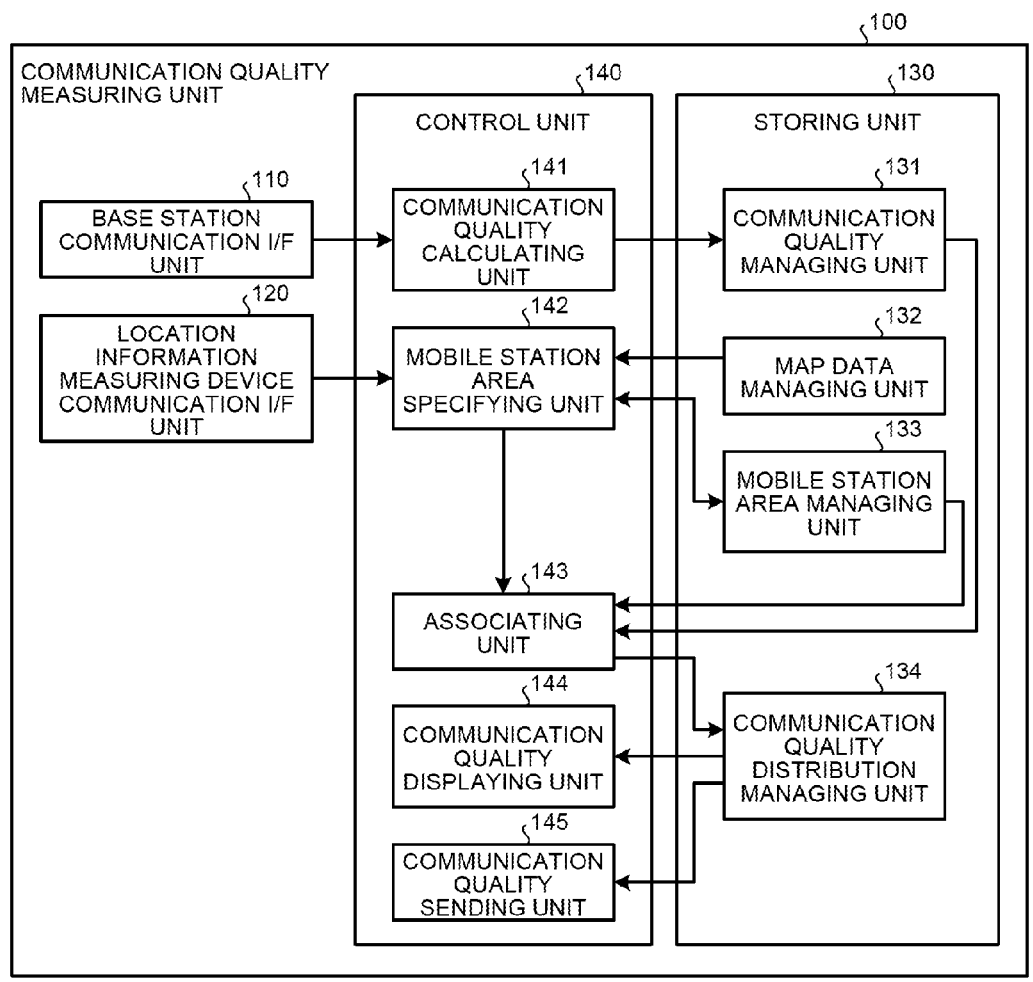
FIG. 2 is a block diagram illustrating an example of the communication quality measuring apparatus according to the first embodiment.

In the following, the configuration of a communication quality measuring apparatus according to the first embodiment will be described. FIG. 2 is a block diagram illustrating an example of a communication quality measuring apparatus according to the first embodiment. As illustrated in FIG. 2, the communication quality measuring apparatus 100 includes a base station communication interface (I/F) unit 110, a location information measuring device communication I/F unit 120, a storing unit 130, and a control unit 140.

The base station communication I/F unit 110 is a communication interface that sends and receives data or a signal to/from a base station 20. For example, the base station communication I/F unit 110 receives, from the base station 20, information that is used to calculate the communication quality of wireless communication.

The location information measuring device communication I/F unit 120 is a communication interface that sends and receives data or a signal to/from the location information measuring device 40. For example, the location information measuring device communication I/F unit 120 receives, from the location information measuring device 40, location information on a mobile station 30.

The storing unit 130 stores therein, for example, data or a program used for various processes executed by the control unit 140. The storing unit 130 is a storage device, such as a memory or a hard disk. The storing unit 130 includes a communication quality managing unit 131, a map data managing unit 132, a mobile station area managing unit 133, and a communication quality distribution managing unit 134.

Figure 3:
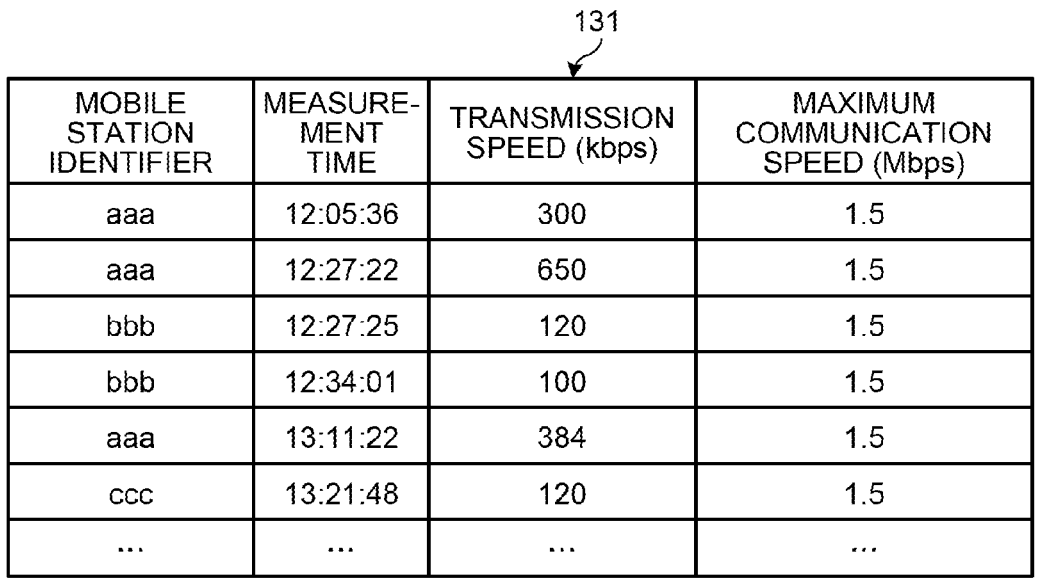
FIG. 3 is a schematic diagram illustrating an example of the communication quality managing unit according to the first embodiment.

The communication quality managing unit 131 stores therein the communication quality of wireless communication between a mobile station and a base station. FIG. 3 is a schematic diagram illustrating an example of the communication quality managing unit according to the first embodiment. As illustrated in FIG. 3, the communication quality managing unit 131 stores therein, in an associated manner, a mobile station identifier, a measurement time, a transmission speed, and a maximum communication speed. The mobile station identifier is an identifier for identifying a mobile station. The measurement time is the time at which the communication quality of wireless communication between a mobile station and a base station is measured (calculated). The transmission speed is the transmission speed of data exchanged between a mobile station and a base station by using wireless communication. The transmission speed is an example of the communication quality of wireless communication. The maximum communication speed is the theoretical maximum value of the transmission speed of data exchanged between a mobile station and a base station by using wireless communication. The maximum communication speed is stored in advance in the communication quality managing unit 131.

For example, the first line in FIG. 3 indicates that, at the time "12:05:36", the transmission speed of wireless communication between a mobile station with the mobile station identifier of "aaa" and a base station is "300" kbps, which is lower than the theoretical maximum value "1.5" Mbps.

Figure 4:
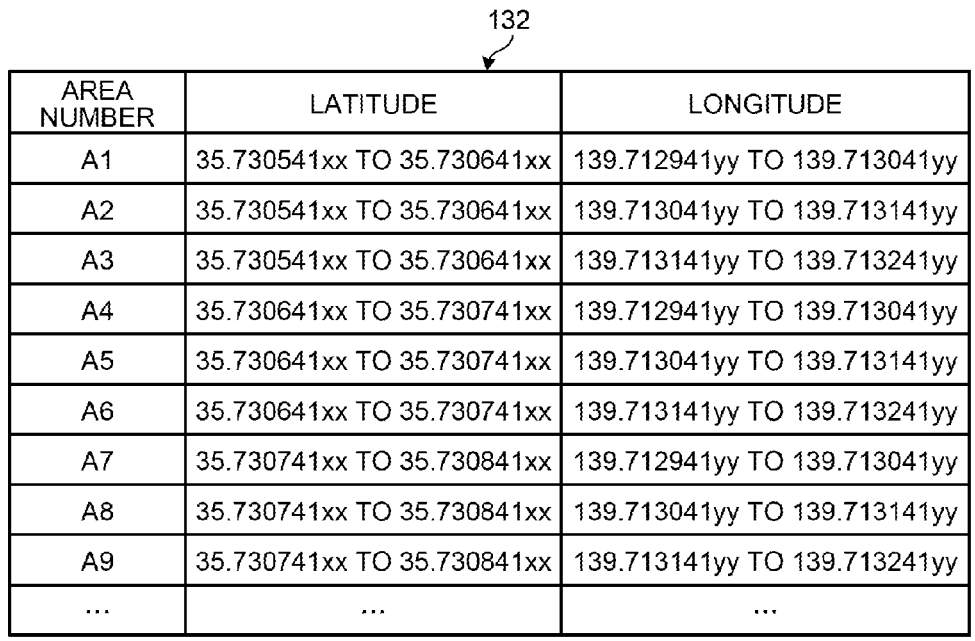
FIG. 4 is a schematic diagram illustrating an example of a map data managing unit according to the first embodiment.

The map data managing unit 132 stores therein map data that includes latitude and longitude of multiple areas on a map. FIG. 4 is a schematic diagram illustrating an example of a map data managing unit according to the first embodiment. As illustrated in FIG. 4, the map data managing unit 132 stores therein, as map data in an associated manner, an area number, a latitude, and a longitude. The area number is an identifier for each of the multiple areas into which the map is divided. The latitude indicates the range of the latitude of the area identified by an area number. The longitude indicates the range of the longitude identified by an area number.

For example, the first line in FIG. 4 indicates that the range of the latitude of the area with the area number of "A1" is "35.730541xx to 35.730641xx" and the range of the longitude of the same area is "139.712941yy to 139.713041yy".

Figure 5:
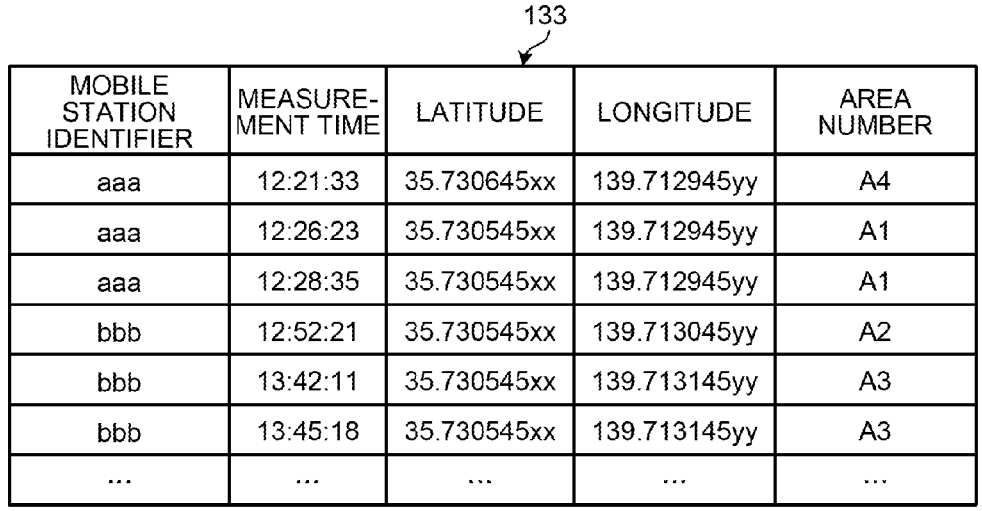
FIG. 5 is a schematic diagram illustrating an example of a mobile station area managing unit according to the first embodiment.

The mobile station area managing unit 133 stores therein information on a mobile station area that is an area in which a mobile station is located. FIG. 5 is a schematic diagram illustrating an example of a mobile station area managing unit according to the first embodiment. As illustrated in FIG. 5, the mobile station area managing unit 133 stores therein, in an associated manner, a mobile station identifier, a measurement time, a latitude, a longitude, and an area number. The mobile station identifier is an identifier for identifying a mobile station. The measurement time is the time at which the location information measuring device 40 measures the location information related to the mobile station. The latitude indicates the latitude used as location information indicating the measured location of the mobile station. The longitude indicates the longitude used as location information indicating the measured location of the mobile station. The area number is an identifier for identifying the mobile station area and that corresponds to the area number illustrated in FIG. 4.

For example, the first line in FIG. 5 indicates that, at the time "12:21:33", the mobile station with the mobile station identifier of "aaa" is located at the latitude of "35.730645xx" and the longitude of "139.712945yy" and indicates that the mobile station area is in a area with the area number of "A4".

Figures 6, 7:
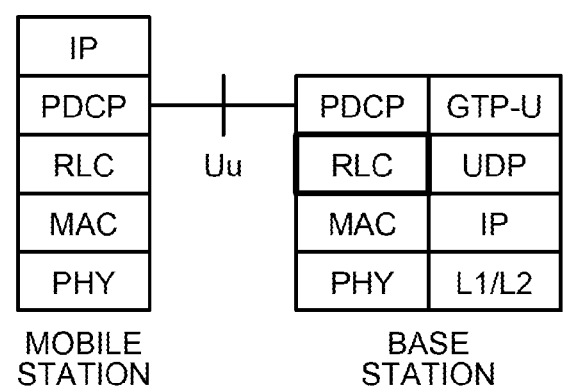
FIG. 6 is a schematic diagram illustrating an example of a communication quality distribution managing unit according to the first embodiment.
FIG. 7 is a schematic diagram illustrating an example of a process performed by a communication quality calculating unit according to the first embodiment.

The communication quality distribution managing unit 134 stores therein, as communication quality distribution, the communication quality that is associated with a mobile station area. FIG. 6 is a schematic diagram illustrating an example of a communication quality distribution managing unit according to the first embodiment. As illustrated in FIG. 6, the communication quality distribution managing unit 134 stores therein, in an associated manner, an area number, a measurement time, a transmission speed, and the number of samples. The area number is an identifier for identifying a mobile station area and corresponds to the area number illustrated in FIG. 5. The measurement time is the time at which the communication quality of wireless communication between a mobile station and a base station is measured (calculated). The transmission speed is the transmission speed of data exchanged between a mobile station and a base station by using wireless communication or is the average value of the transmission speed thereof. The number of samples is the sample count of the transmission speed that is used when the average value of the transmission speed is obtained.

For example, the first line in FIG. 6 indicates that, at the time "12:27:22", the transmission speed in the area with the area number of "A1" or the average value of the transmission speed is "650" kbps.

The control unit 140 controls the communication quality measuring apparatus 100. The control unit 140 is implemented by a central processing unit (CPU) or a program analyzed and executed by the CPU. Alternatively, the control unit 140 may also be implemented by using a field programmable gate array (FPGA). The control unit 140 includes a communication quality calculating unit 141, a mobile station area specifying unit 142, an associating unit 143, a communication quality displaying unit 144, and a communication quality sending unit 145.

The communication quality calculating unit 141 collects, from the base station 20 via the base station communication I/F unit 110, information used to calculate the communication quality of wireless communication (hereinafter, referred to where appropriate as "communication quality calculation information"). Specifically, as illustrated in FIG. 7, the communication quality calculating unit 141 monitors a radio link control (RLC) layer terminated at a base station and then collects communication quality calculation information from the RLC layer during a predetermined measurement time period. The communication quality calculation information is, for example, an identifier of a mobile station, the number of transport blocks (TBs) that can be theoretically sent, the number of actual TBs including the number of resent TBs, or the total data volume in a U-Plane in an RLC protocol data unit (PDU) that has received an ACK response. FIG. 7 is a schematic diagram illustrating an example of a process performed by a communication quality calculating unit according to the first embodiment.

The communication quality calculating unit 141 calculates the communication quality of wireless communication by using the communication quality calculation information collected from the base station 20. In the first embodiment, the communication quality calculating unit 141 calculates, as the communication quality of wireless communication, the transmission speed of data exchanged during wireless communication. Here, it is assumed that the number of TBs that can be theoretically sent and that is collected from the RLC layer in the base station 20 during the predetermined measurement time period "T" sec is "X" and it is assumed that the number of actual TBs including the number of resent TBs is "Y". Furthermore, it is assumed that the total data volume of a U-Plane in an RLC protocol data unit (PDU) that receives an ACK response is "M" bytes. If X=Y is satisfied, the communication quality calculating unit 141 determines that the data in the U-Plane is valid. Specifically, if there is no space in the wireless resource of the U-Plane and all of the wireless resources are used, the communication quality calculating unit 141 determines that the data in the U-Plane is valid. In contrast, if X>Y is satisfied, the communication quality calculating unit 141 determines that the data in the U-Plane is invalid. This is because if X>Y is satisfied, there is a space in the wireless resource of the U-Plane; therefore, the data in the U-Plane is preferably excluded from the calculation target for the communication quality. Then, the communication quality calculating unit 141 calculates the above described transmission speed on the basis of the predetermined measurement time period and the volume of all the pieces of data that are determined to be valid in the U-Plane. The transmission speed is calculated by using Equation (1) below. Then, the communication quality calculating unit 141 stores, in the communication quality managing unit 131 for each identifier of a mobile station, the calculated transmission speed and the current time.

$$S=M/T \qquad (1)$$

where,
S: transmission speed (bps)
M: total volume of data in a U-Plane (bit)
T: predetermined measurement time period (sec)

The mobile station area specifying unit 142 collects location information on the mobile station 30 from the location information measuring device 40 via the location information measuring device communication I/F unit 120. Specifically, the mobile station area specifying unit 142 collects, from the location information measuring device 40, the latitude and the longitude that are used as the location information on the mobile station 30 and also collects the identifier of the mobile station 30 and the measurement time of location information. Then, the mobile station area specifying unit 142 stores, in the mobile station area managing unit 133 for each identifier of the mobile station 30, the collected latitude and the longitude of the mobile station 30 and the measurement time of the location information.

The mobile station area specifying unit 142 specifies a mobile station area by using the collected location information on the mobile station 30. Specifically, the mobile station area specifying unit 142 notifies the map data managing unit 132 of the collected location information on the mobile station 30. Then, the mobile station area specifying unit 142 receives, from the map data managing unit 132, the response indicating the area number of the area that includes the latitude and the longitude used for the location information on the mobile station 30. Then, the mobile station area specifying unit 142 specifies the mobile station area by storing, in an associated manner in the mobile station area managing unit 133, the location information on the mobile station 30 and the area number of the area.

In the following, a description will be given of an example of a process in which the mobile station area specifying unit 142 specifies a mobile station area. It is assumed, for example, that the latitude and the longitude used as the location information on the mobile station 30 are "35.730645xx" and "139.712945yy", respectively. Furthermore, it is assumed that the range "35.730641xx to 35.730741xx" of the latitude and the range "139.712941yy to 139.713041yy" of the longitude are associated with the area number "A4" and are stored in the map data managing unit 132. In such a case, the mobile station area specifying unit 142 receives, from the map data managing unit 132, a response indicating the area number "A4", which is an area in the area and which includes the latitude and the longitude that are used as the location information on the mobile station 30. Subsequently, by associating the latitude and the longitude that are used as the location information on the mobile station 30 with the area number "A4" of the area and storing them in the mobile station area managing unit 133, the mobile station area specifying unit 142 specifies the area with the area number of "A4" as a mobile station area.

Furthermore, the mobile station area specifying unit 142 specifies, as a mobile station area from among multiple areas on the map, a area that includes two pieces of location information that are related to the same mobile station and whose measurement times are consecutive. Specifically, if the mobile station area specifying unit 142 refers to the mobile station area managing unit 133 and detects, in entries having the same mobile station identifier, the same area number that has consecutive measurement times, the mobile station area specifying unit 142 specifies the area associated with that area number as a mobile station area. Then, if the mobile station area specifying unit 142 specifies, as a mobile station area, the area that includes the two pieces of location information that are related to the same mobile station and whose measurement times are consecutive, the mobile station area specifying unit 142 notifies the associating unit 143 of this.

The associating unit 143 associates, for each mobile station area specified by the mobile station area specifying unit 142, the communication quality calculated by the communication quality calculating unit 141. Specifically, if the associating unit 143 receives, from the mobile station area specifying unit 142, a notification indicating that the area that includes two pieces of location information that are related to the same mobile station and whose measurement times are consecutive is specified as a mobile station area, the associating unit 143 associates the identifier of that area with the communication quality. Then, the associating unit 143 stores, as communication quality distribution in the communication quality distribution managing unit 134, the communication quality associated with the mobile station area (i.e., the identifier of the area).

Figure 8:
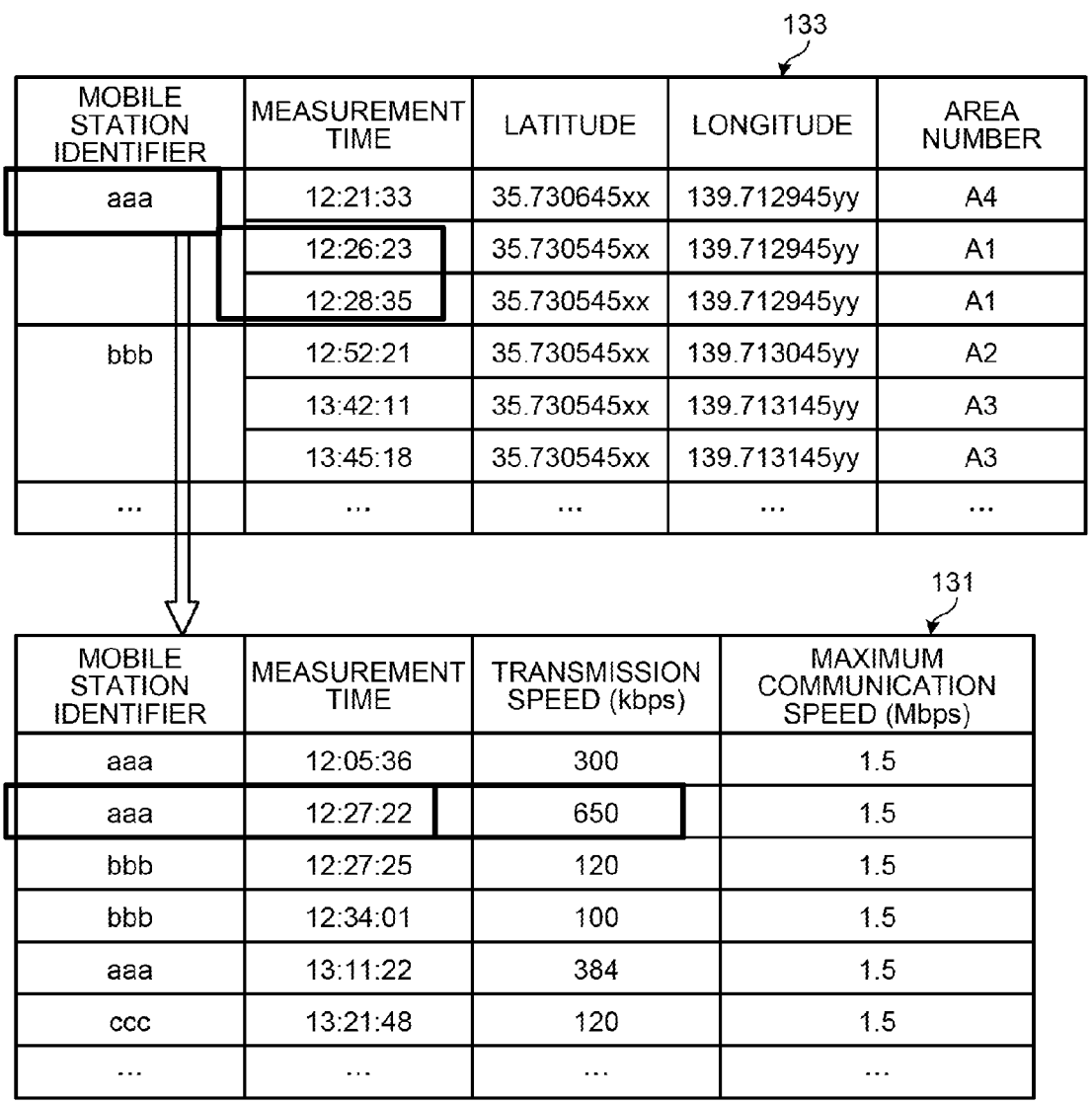
FIG. 8 is a schematic diagram illustrating an example of an associating process according to the first embodiment.

In the following, a description will be given of an example of an associating process performed by the mobile station area specifying unit 142 and the associating unit 143. FIG. 8 is a schematic diagram illustrating an example of an associating process according to the first embodiment. The upper portion in FIG. 8 is the mobile station area managing unit 133 illustrated in FIG. 5 and the lower portion in FIG. 8 is the communication quality managing unit 131 illustrated in FIG. 3. As illustrated in the upper portion in FIG. 8, the mobile station area specifying unit 142 refers to the mobile station area managing unit 133 and detects, in entries in which the mobile station identifier is "aaa", the same area number "A1" having the consecutive measurement times. In such a case, the mobile station area specifying unit 142 specifies the area that is associated with the area number "A1" as a mobile station area. Accordingly, the mobile station area specifying unit 142 notifies the associating unit 143 that the area that includes two pieces of location information that are related to the same mobile station and whose measurement times are consecutive, i.e., the area associated with the area number "A1", is specified as a mobile station area.

In contrast, as a trigger when the associating unit 143 receives, from the mobile station area specifying unit 142, a notification indicating that the area associated with the area number "A1" is specified as a mobile station area, the associating unit 143 performs the following process. Namely, as illustrated in the upper portion in FIG. 8, the associating unit 143 refers to the mobile station area managing unit 133 and acquires the area number "A1", the mobile station identifier "aaa" associated with the area number "A1", and the consecutive measurement times "12:26:23" and "12:28:35". Subsequently, as illustrated in the lower portion in FIG. 8, the associating unit 143 refers to the communication quality managing unit 131 and searches for entries that match the mobile station identifier "aaa" obtained from the mobile station area managing unit 133. From among the searched for entries, the associating unit 143 specifies an entry that is present at the measurement time between "12:26:23" and "12:28:35". The associating unit 143 acquires the transmission speed "650" kbps of the specified entry from the communication quality managing unit 131, associates the acquired transmission speed "650" kbps with the area number "A1", and then stores it in the communication quality distribution managing unit 134. Furthermore, the associating unit 143 associates the measurement time "12:27:22" of the specified entry with the area number "A1", stores it in the communication quality distribution managing unit 134, and then increments the number of samples.

If the communication quality (transmission speed) has already been associated with a mobile station area, i.e., if the number of samples in the communication quality distribution managing unit 134 is other than 0, the associating unit 143 performs the following process. Namely, the associating unit 143 calculates the average value of the transmission speed and stores the calculated average value of the transmission speed in the item represented by the transmission speed in the communication quality distribution managing unit 134. The average value of the transmission speed can be calculated using Equation (2) below:

$$S1 = ((Sa \times N) + Snew)/(N+1) \quad (2)$$

where,

S1: average value (bps) of the transmission speed

Sa: average value (bps) of transmission speed immediately previously calculated

N: the number of samples (N>0)

Snew: the current transmission speed (bps) extracted from the communication quality managing unit 131

Figure 9:
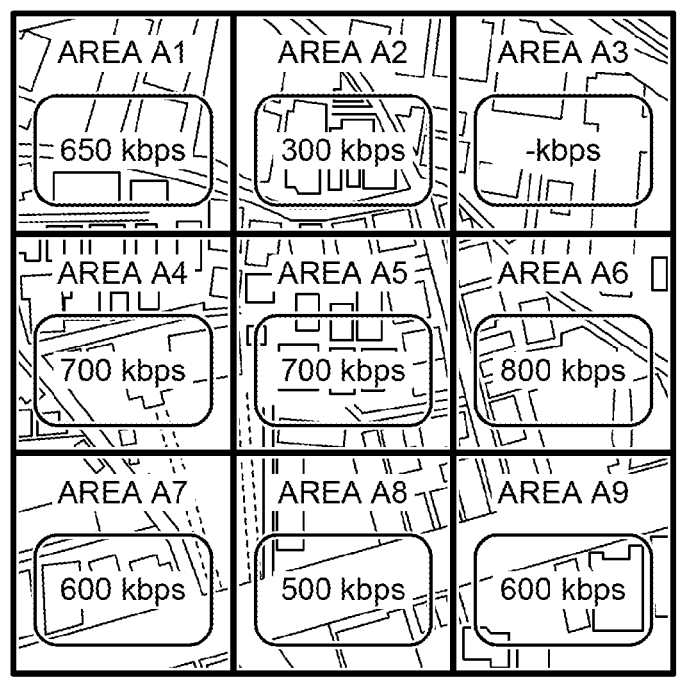
FIG. 9 is a schematic diagram illustrating an example of a display screen created by a communication quality displaying unit according to the first embodiment.

A description will be given here by referring back to FIG. 2. The communication quality displaying unit 144 creates a display screen on a predetermined display unit on the basis of the information stored in the communication quality distribution managing unit 134. Specifically, the communication quality displaying unit 144 creates a display screen that displays, on multiple areas that are associated with multiple mobile station areas on a map by the associating unit 143, communication qualities associated with the mobile station areas. FIG. 9 is a schematic diagram illustrating an example of a display screen created by a communication quality displaying unit according to the first embodiment.

For example, on the basis of the information stored in the communication quality distribution managing unit 134 illustrated in FIG. 6, the communication quality displaying unit 144 creates the display screen illustrated in FIG. 9. Specifically, on multiple areas associated with multiple mobile station areas "A1" to "A9" on a map, the communication quality displaying unit 144 creates a display screen that displays communication qualities associated with mobile station areas by the associating unit 143. For example, in the area associated with the mobile station area "A1" on the map, the communication quality distribution managing unit 134 creates a display screen that displays the transmission speed "650" kbps that is used as the communication quality and that is associated with the mobile station area "A1". Furthermore, for example, in the area associated with the mobile station area "A2" on the map, the communication quality distribution managing unit 134 creates a display screen that displays the transmission speed "300" kbps that is used as the communication quality and that is associated with the mobile station area "A2".

The communication quality sending unit 145 sends, to external devices, the communication quality that is associated with each mobile station area by the associating unit 143. Specifically, the communication quality sending unit 145 sends, as the communication quality to the external devices, the communication quality distribution stored in the communication quality distribution managing unit 134, i.e., a combination of the area number, the measurement time, the transmission speed, and the number of samples. The external devices mentioned here are various kinds of devices, such as the base station 20, the mobile station 30, and the like, included in the communication system 1.

Figure 10:
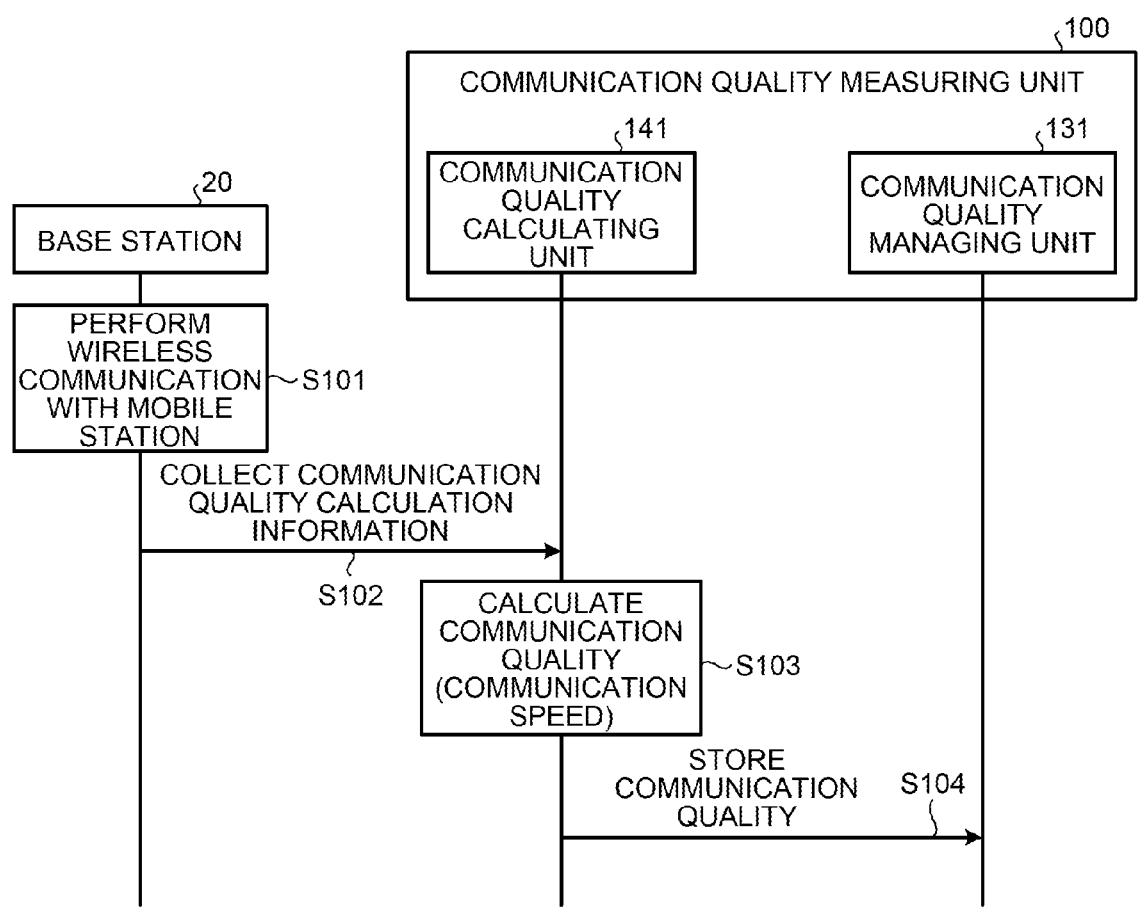
FIG. 10 is a sequence diagram illustrating the operation (performed when communication quality is calculated) of the communication system that includes the communication quality measuring apparatus according to the first embodiment.

In the following, a description will be given of the operation of the communication system that includes the communication quality measuring apparatus according to the first embodiment. FIG. 10 is a sequence diagram illustrating the operation (performed when communication quality is calculated) of the communication system that includes the communication quality measuring apparatus according to the first embodiment.

As illustrated in FIG. 10, when wireless communication between the base station 20 and the mobile station 30 is being performed (Step S101), the communication quality calculating unit 141 in the communication quality measuring apparatus 100 collects communication quality calculation information from the base station 20 (Step S102).

By using the communication quality calculation information collected from the base station 20, the communication quality calculating unit 141 calculates the communication quality of wireless communication (Step S103). In the first embodiment, the communication quality calculating unit 141 calculates, as the communication quality of wireless communication, the transmission speed of data exchanged during wireless communication.

The communication quality calculating unit 141 stores, in the communication quality managing unit 131, the calculated transmission speed together with the current time and the identifier of the mobile station (Step S104).

Figure 11:
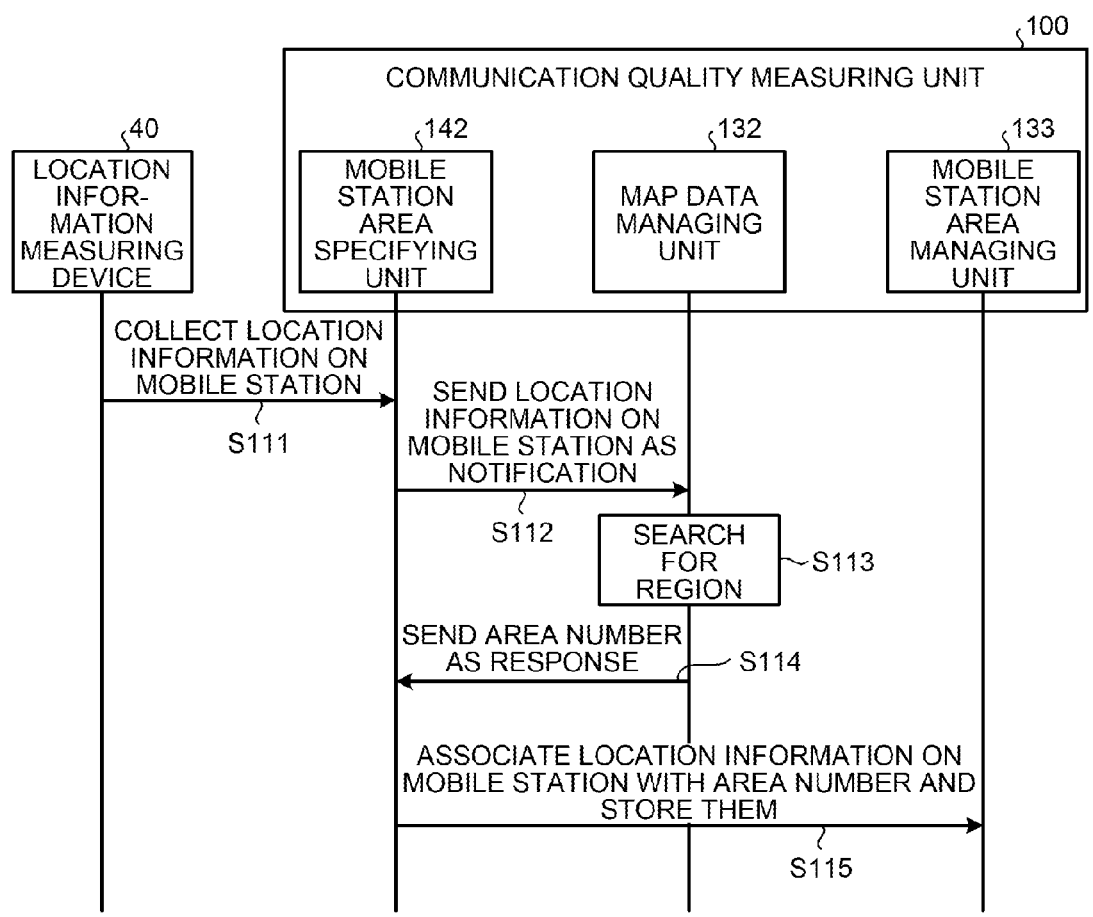
FIG. 11 is a sequence diagram illustrating the operation (performed when a mobile station area is specified) of the communication system that includes the communication quality measuring apparatus according to the first embodiment.

FIG. 11 is a sequence diagram illustrating the operation (performed when a mobile station area is specified) of the communication system that includes the communication quality measuring apparatus according to the first embodiment.

As illustrated in FIG. 11, the mobile station area specifying unit 142 in the communication quality measuring apparatus 100 collects the location information on the mobile station 30 from the location information measuring device 40 (Step S111). The mobile station area specifying unit 142 notifies the map data managing unit 132 of the collected location information on the mobile station 30 (Step S112).

The map data managing unit 132 searches for a area that includes the latitude and the longitude that are used as the location information on the mobile station 30 received from the mobile station area specifying unit 142 as a notification (Step S113). If the area that includes the latitude and the longitude that are used as the location information on the mobile station 30 is searched for, the map data managing unit 132 responds to the mobile station area specifying unit 142 indicating the area number of that area (Step S114).

The mobile station area specifying unit 142 receives, from the map data managing unit 132, a response indicating the area number of the area that includes the latitude and the longitude that are used as the location information on the mobile station 30. The mobile station area specifying unit 142 associates the location information on the mobile station 30 with the area number and then stores them in the mobile station area managing unit 133, thereby specifying a mobile station area (Step S115).

Figure 12:
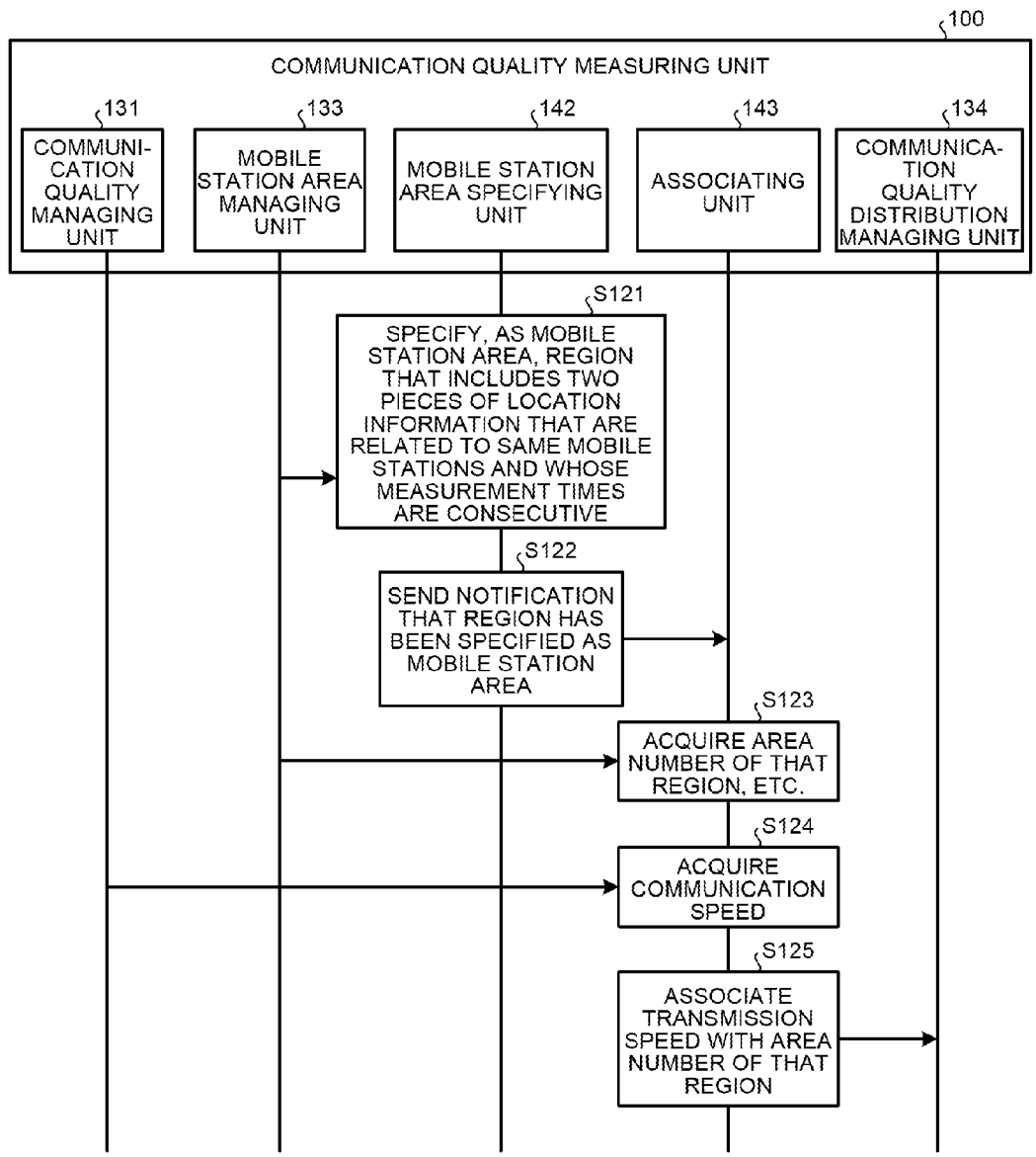
FIG. 12 is a sequence diagram illustrating the operation (at the time of an associating process) of the communication system that includes the communication quality measuring apparatus according to the first embodiment.

FIG. 12 is a sequence diagram illustrating the operation (at the time of an associating process) of the communication system that includes the communication quality measuring apparatus according to the first embodiment.

As illustrated in FIG. 12, the mobile station area specifying unit 142 in the communication quality measuring apparatus 100 specifies, as a mobile station area, a area that includes two pieces of location information that are related to the same mobile stations and whose measurement times are consecutive (Step S121). If the area that includes the two pieces of location information that are related to the same mobile station and whose measurement times are consecutive are specified as a mobile station area, the mobile station area specifying unit 142 notifies the associating unit 143 that the area has been specified as a mobile station area (Step S122).

The associating unit 143 receives, from the mobile station area specifying unit 142, a notification that the area that includes two pieces of location information that are related to the same mobile station and whose measurement times are consecutive is specified as the mobile station area. The associating unit 143 performs the following process triggered when the notification is received. Namely, the associating unit 143 refers to the mobile station area managing unit 133 and acquires the area number of the area that includes two pieces of location information that are related to the same mobile station and whose measurement times are consecutive, acquires the mobile station identifier associated with the area number, and acquires the consecutive measurement times (Step S123).

Subsequently, the associating unit 143 acquires the transmission speed from the communication quality managing unit 131 (Step S124). Specifically, the associating unit 143 refers to the communication quality managing unit 131, searches for entries that match the acquired mobile station identifier, and specifies entries, from among the searched entries, that are present between consecutive measurement times. The associating unit 143 acquires the transmission speed of the specified entries from the communication quality managing unit 131.

Subsequently, the associating unit 143 associates the transmission speed acquired from the communication quality managing unit 131 with the area number that has been acquired at Step S123 and stores it in the communication quality distribution managing unit 134 (Step S125).

As described above, according to the first embodiment, in the communication quality measuring apparatus 100, the communication quality calculating unit 141 collects communication quality calculation information from the base station 20 that performs wireless communication with the mobile station 30 and then calculates the communication quality by using the collected communication quality calculation information. The mobile station area specifying unit 142 collects the location information on the mobile station 30 from the location information measuring device 40 and then specifies a mobile station area in which the mobile station 30 is located by using the collected location information. The associating unit 143 associates the communication quality with the mobile station area. Consequently, it is possible to prevent the processing load for measuring the communication quality from being placed on a mobile station and it is possible to dynamically calculate the communication quality in accordance with the state of wireless communication. Consequently, it is possible to precisely measure the communication quality for each area in which a mobile station is located while avoiding an increase in the processing load placed on the mobile station.

[b] Second Embodiment

Figure 13:
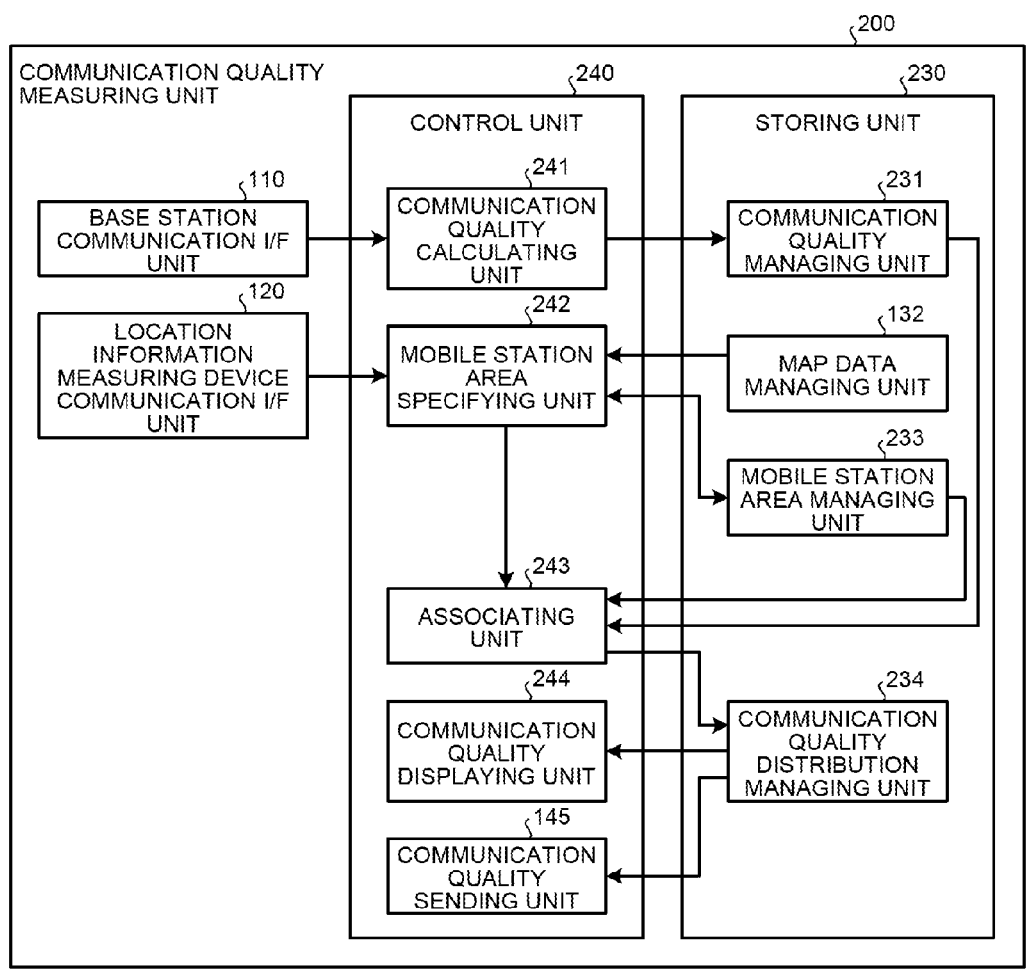
FIG. 13 is a block diagram illustrating an example of a communication quality measuring apparatus according to a second embodiment.

In the following, a second embodiment will be described. The configuration of a communication system according to the second embodiment is the same as that of the communication system according to the first embodiment illustrated in FIG. 1. FIG. 13 is a block diagram illustrating an example of a communication quality measuring apparatus according to a second embodiment. As illustrated in FIG. 13, in the second embodiment, components having the same configuration as those in the first embodiment are assigned the same reference numerals and descriptions of such components in detail are omitted. The second embodiment differs from the first embodiment in the procedure of the associating process and in the method of displaying the communication quality. Specifically, in the first embodiment, communication qualities are associated with identifiers for multiple areas on a map and are displayed for each areas on the map. However, in the second embodiment, the communication qualities are associated with identifiers of diagram areas that include a starting point location and an end point location of the moving range of a mobile station and are displayed for each diagram area.

As illustrated in FIG. 13, a communication quality measuring apparatus 200 includes a storing unit 230 and a control unit 240 instead of the storing unit 130 and the control unit 140 illustrated in FIG. 2. The storing unit 230 includes a communication quality managing unit 231, the map data managing unit 132, a mobile station area managing unit 233, and a communication quality distribution managing unit 234.

The communication quality managing unit 231 stores therein the communication quality of wireless communication between a mobile station and a base station. FIG. 14 is a schematic diagram illustrating an example of a communication quality managing unit according to the second embodiment. As illustrated in FIG. 14, the communication quality managing unit 231 stores therein, in an associated manner, a mobile station identifier, a measurement time, and a communication traffic volume. The mobile station identifier is an identifier for identifying a mobile station. The measurement time is the time at which the communication quality of wireless communication between a mobile station and a base station is measured (calculated). The communication traffic volume is the volume of communication traffic of data exchanged between a mobile station and a base station by using wireless communication. The communication traffic volume is an example of the communication quality of wireless communication.

For example, the first line in FIG. 14 indicates, at the time "12:05:36", the communication traffic volume of wireless communication between a mobile station with the mobile station identifier of "aaa" and a base station is "3" Kbytes.

The mobile station area managing unit 233 stores therein information on a mobile station area that is an area in which a mobile station is located. FIG. 15 is a schematic diagram illustrating an example of a mobile station area managing unit according to the second embodiment. As illustrated in FIG. 15, the mobile station area managing unit 233 stores therein, in an associated manner, a mobile station identifier, a measurement time, a latitude, a longitude, a moving range identifier, and a diagram area identifier. The mobile station identifier mentioned here is an identifier for identifying a mobile station. The measurement time is the time at which the location information measuring device 40 measures location information related to the mobile station. The latitude is the latitude used as location information on the mobile station. The longitude is the longitude used as location information on the mobile station.

The moving range identifier is an identifier for identifying the moving range of a mobile station when the mobile station moves from the starting point to the end point. If the location of a certain point is the starting point location of the moving range of a mobile station, Sx (x is an integer equal to or greater than 1) is set as the moving range identifier. In contrast, if the location of a certain point is the end point location of the moving range of a mobile station, Ex (x is an integer equal to or greater than 1) is set as the moving range identifier. A combination of Sx and Ex corresponds to a single moving range of a mobile station.

The diagram area identifier is an identifier for identifying a diagram area that includes the starting point location and the end point location of the moving range of the mobile station and that is identified by the moving range identifier. The diagram area mentioned here is an example of a mobile station area. The diagram area will be described in detail later.

For example, the first and the second lines in FIG. 15 indicate that, if the mobile station with the mobile station identifier of "aaa" moves from the starting point location "S1" to the end point location "E1", the diagram area that includes the starting point location and the end point location of the moving range of the mobile station is "P".

The communication quality distribution managing unit 234 stores, as communication quality distribution, the communication quality associated with a mobile station area. FIG. 16 is a schematic diagram illustrating an example of a communication quality distribution managing unit according to the second embodiment. As illustrated in FIG. 16, the communication quality distribution managing unit 234 stores therein, in an associated manner, a mobile station identifier, a measurement time, a latitude, a longitude, a moving range identifier, a diagram area identifier, a communication traffic volume, and a communication traffic volume density. The mobile station identifier, the measurement time, the latitude, the longitude, the moving range identifier, and the diagram area identifier corresponds to the mobile station identifier, the measurement time, the latitude, the longitude, the moving range identifier, and the diagram area identifier illustrated in FIG. 15, respectively.

The communication traffic volume is the volume of communication traffic of data exchanged between a mobile station and a base station by using wireless communication during a time period in which the mobile station moves from the starting point location to the end point location in the moving range. The communication traffic volume density indicates the communication traffic volume per unit area in a diagram area. The communication traffic volume density mentioned here is an example of the communication quality density.

For example, the first and second lines in FIG. 16 indicate that the communication traffic volume of the diagram area "P" that includes the starting point location "S1" and the end point location "E1" of the moving range of the mobile station "aaa" is "3.5" Kbytes during a time period in which the mobile station "aaa" moves from the starting point location to the end point location. Furthermore, the first and the second lines in FIG. 16 indicate that the communication traffic volume density of the diagram area "P" that includes the starting point location "S1" and the end point location "E1" of the moving range of the mobile station "aaa" is "5000" kbytes/m$^2$ during a time period in which the mobile station "aaa" moves from the starting point location to the end point location.

The control unit 240 includes a communication quality calculating unit 241, a mobile station area specifying unit 242, an associating unit 243, a communication quality displaying unit 244, and the communication quality sending unit 145.

The communication quality calculating unit 241 collects communication quality calculation information from the base station 20 via the base station communication I/F unit 110. Specifically, the communication quality calculating unit 241 monitors an RLC layer terminated at a base station and then collects communication quality calculation information from the RLC layer during a predetermined measurement time period. The communication quality calculation information is, for example, an identifier of a mobile station or the total data volume in a U-Plane in an RLC protocol data unit (PDU) that has received an ACK response.

The communication quality calculating unit 241 calculates the communication quality of wireless communication by using the communication quality calculation information collected from the base station 20. In the second embodiment, the communication quality calculating unit 241 calculates, as the communication quality of wireless communication, the communication traffic volume of data exchanged during wireless communication. Here, it is assumed that the total data volume in the U-Plane collected from the RLC layer in the base station 20 during the predetermined measurement time period "T" sec is "M" bytes. The communication quality calculating unit 241 calculates, as the communication traffic volume, the total data volume of the U-Plane at the time after the measurement time period "T" sec has elapsed. The communication quality calculating unit 241 stores, in the communication quality managing unit 231 for each identifier of a mobile station, the calculated communication traffic volume and the current time.

The mobile station area specifying unit 242 collects location information on the mobile station 30 from the location information measuring device 40 via the location information measuring device communication I/F unit 120. Specifically, the mobile station area specifying unit 242 collects, from the location information measuring device 40, the latitude and the longitude that are used as location information on the mobile station 30 and also collects the measurement time of the location information on the mobile station 30. Then, the mobile station area specifying unit 242 stores, in the mobile station area managing unit 233 for each identifier of the mobile station 30, the collected latitude and the longitude of the mobile station 30 and the measurement time of the location information.

The mobile station area specifying unit 242 specifies a mobile station area by using the collected location information on the mobile station 30. Specifically, the mobile station area specifying unit 242 stores, in the mobile station area managing unit 233, the location information on the mobile station 30 as the starting point location of the moving range of the mobile station. For example, in the mobile station area managing unit 233, the mobile station area specifying unit 242 sets "Sx", which indicates the starting point location, as the moving range identifier that is associated with the latitude and the longitude that are used as the location information on the mobile station 30. Thereafter, if the mobile station area specifying unit 242 again collects location information on the mobile station 30, the mobile station area specifying unit 242 stores the location information on the mobile station 30 in the mobile station area managing unit 233 as the end point location of the moving range of the mobile station. For example, in the mobile station area managing unit 233, the mobile station area specifying unit 242 sets "Ex", which indicates the end point location, to the moving range identifier that is associated with the latitude and the longitude used as the location information on the mobile station 30. Subsequently, the mobile station area specifying unit 242 creates a diagram area, in which two pieces of location information that are related to the same mobile station and whose measurement times are consecutive are included as the starting point location and the end point location of the moving range of the mobile station, and then specifies the created diagram area as a mobile station area. The mobile station area specifying unit 242 stores the identifier of the specified diagram area in the mobile station area managing unit 233.

In the following, a diagram area created by the mobile station area specifying unit 242 will be described in detail. The diagram area created by the mobile station area specifying unit 242 (hereinafter, simply referred to as a "diagram area") is a diagram area used to visualize the moving range of a mobile station. Any diagram area may also be used for the diagram area as long as the area includes the starting point location and the end point location of the moving range of a mobile station. For example, the diagram area may be a rectangular area that includes the starting point location and the end point location of the moving range of a mobile station as the mid point locations of two opposing sides. Furthermore, for example, the diagram area may be an oval area that includes the starting point location and the end point location of the moving range of a mobile station as the end location of the long axis of the oval area. In the description below, it is assumed that the diagram area is a rectangular area that includes the starting point location and the end point location of the moving range of a mobile station as the mid point locations of two opposing sides. On the basis of the starting point location and the end point location of the moving range of a mobile station and on the basis of the reference diagram area that is a template diagram area, the mobile station area specifying unit 242 creates a diagram area that includes the starting point location and the end point location of the moving range of the mobile station.

Figure 17:
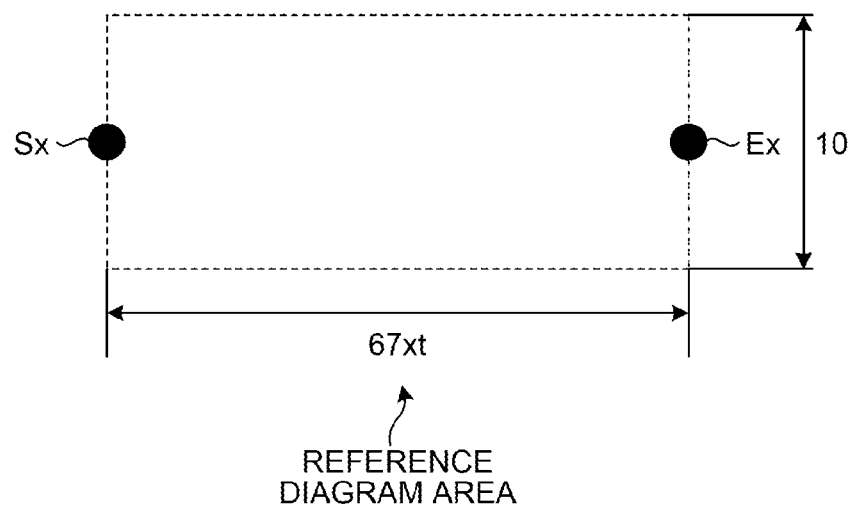
FIG. 17 is a schematic diagram illustrating an example of a reference diagram area.

In the following, a description will be given of an example of a creating process of a diagram area. First, the mobile station area specifying unit 242 calculates the physical area of the reference diagram area. FIG. 17 illustrates an example of the reference diagram area. The reference diagram area is a rectangular area that includes the starting point location "Sx" and the end point location "Ex" of the moving range of a mobile station as the mid point locations of two opposing sides. Specifically, the reference diagram area is a rectangular area obtained by visualizing the moving range of a mobile station if the walking speed of a user of the mobile station is set to 67 (m/min), the time period for which the user of the mobile station walks is set to t (min), the width of a path along which the user of the mobile station walks is set to 10 (m). The area of the reference diagram area is calculated by using Equation (3) below:

$$Sbasic = 67 \times t \times 10 \tag{3}$$

where,
Sbasic: area of the reference diagram area ($m^2$)
t: time corresponding the difference between the measurement time of location information at the starting point location "Sx" and that at the end point location "Ex" (min)

Subsequently, the mobile station area specifying unit 242 calculates the distance between the starting point location "Sx" and the end point location "Ex". If the latitude and the longitude of the starting point location "Sx" are Xs and Ys, respectively, and if the latitude and the longitude of the end point location "Ex" are Xe and Ye, respectively, the difference idosa between the latitudes and the difference keidosa between the longitudes are represented by Equations (4) and (5), respectively, below:

$$idosa = (\pi/180) \times (Xe - Xs) \tag{4}$$

$$keidosa = (\pi/180) \times (Ye - Ys) \tag{5}$$

where, Xs, Ys, Xe, and Ye are values converted by using a decimal number system.

The distance dns in a north-south direction and the distance dew in an east-west direction between the starting point location "Sx" and the end point location "Ex" are represented by Equations (6) and (7), respectively, below:

$$dns = r \times idosa \tag{6}$$

$$dew = r \times keidosa \times \cos((\pi/180) \times Xe) \tag{7}$$

By using dns obtained from Equation (6) and dew obtained from Equation (7), the distance d between the starting point location "Sx" and the end point location "Ex" is calculated by using Equation (8) below:

$$d = \sqrt{d_{ns}^2 + d_{ew}^2} \tag{8}$$

Then, the mobile station area specifying unit 242 calculates the width of the rectangular area whose physical area is the same as that of the reference diagram area, i.e., the width w of the rectangular area in which the starting point location "Sx" and the end point location "Ex" of the moving range of a mobile station are included as the mid point locations of two opposing sides. Specifically, the mobile station area specifying unit 242 calculates the width w by using Equation (9) below:

$$w = Sbasic/d \tag{9}$$

Figure 18:
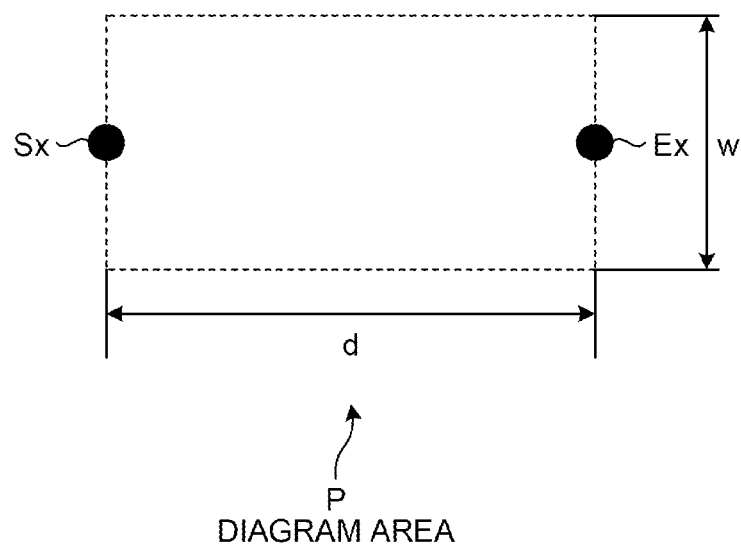
FIG. 18 is a schematic diagram illustrating an example of a diagram area P.
Figure 19:
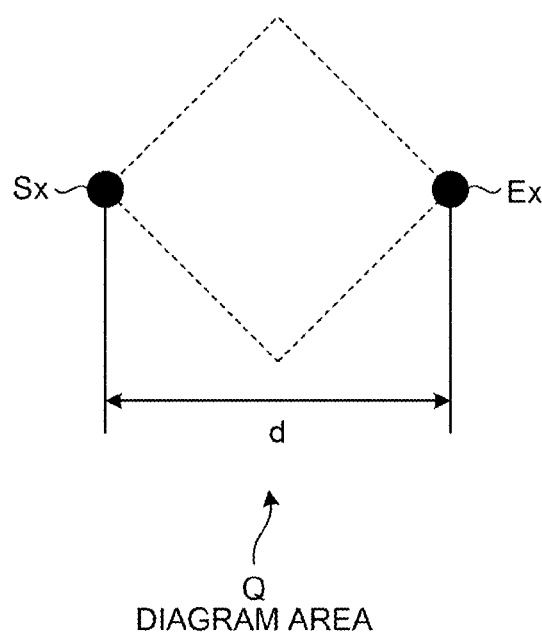
FIG. 19 is a schematic diagram illustrating an example of a diagram area Q.

Subsequently, the mobile station area specifying unit 242 selects a diagram area P or a diagram area Q in accordance with the width w and then creates the selected diagram area. Specifically, if 3≤w≤300 is satisfied, the mobile station area specifying unit 242 selects the diagram area P illustrated in FIG. 18 and creates the diagram area P. The diagram area P is a rectangular area in which the starting point location "Sx" and the end point location "Ex" of the moving range of a mobile station are included as the mid point locations of two opposing sides. In the diagram area P, the length of the long side is d and the length of the short side is w. Furthermore, if w>300 is satisfied, the mobile station area specifying unit 242 selects the diagram area Q illustrated in FIG. 19 and creates the diagram area Q. The diagram area Q is square with the starting point location "Sx" and the end point location "Ex" of the moving range of a mobile station being the ends of a diagonal line. In the diagram area Q, the length of the diagonal line is d.

Furthermore, if the mobile station area specifying unit 242 specifies, as a mobile station area, a diagram area that includes two pieces of location information that are related to the same mobile station and whose measurement times are consecutive as the starting point location and the end point location of the moving range of a mobile station, the mobile station area specifying unit 242 notifies the associating unit 243 of this.

A description will be given here by referring back to FIG. 13. If the associating unit 243 receives, from the mobile station area specifying unit 242, a notification that a diagram area that includes the starting point location and the end point location of the moving range is specified as a mobile station area, the associating unit 243 associates, the associating being performed as a trigger when the notification has been received, the identifier of the diagram area with the communication quality. The communication quality associated with the identifier of the diagram area includes the communication traffic volume and the communication traffic volume density. The communication traffic volume mentioned here is the volume of communication traffic of data exchanged during wireless communication between a mobile station and a base station during a time period in which the mobile station moves from the starting point location to the end point location in the moving range. Furthermore, the communication traffic volume density mentioned here is a value obtained by dividing the communication traffic volume by the physical area of a diagram area. Then, the associating unit 243 stores, as the communication quality distribution in the communication quality distribution managing unit 234, the communication quality associated with the identifier of the diagram area.

In the following, a description will be given of an example of an associating process performed by the mobile station area specifying unit 242 and the associating unit 243. The mobile station area specifying unit 242 refers to the mobile station area managing unit 233 illustrated in FIG. 15 and specifies, for entries in which the mobile station identifier is "aaa", the diagram area "P" that includes two pieces of location information whose measurement times are consecutive as the starting point location "S1" and the end point location "E1" of the moving range of a mobile station. Consequently, the mobile station area specifying unit 242 notifies the associating unit 243 that the diagram area "P" has been specified as the mobile station area.

Furthermore, the associating unit 243 performs the following process triggered when the associating unit 243 receives a notification that the diagram area "P" has been specified as the mobile station area from the mobile station area specifying unit 242. Namely, the associating unit 243 refers to the mobile station area managing unit 233 and acquires the diagram area "P", the mobile station identifier "aaa" that is associated with both the starting point location "S1" and the end point location "E1" included in the diagram area "P", and the consecutive measurement times "12:05:36" and "12:27:22". Then, the associating unit 243 refers to the communication quality managing unit 231 illustrated in FIG. 14 and searches for entries that match the mobile station identifier "aaa" acquired from the mobile station area managing unit 233. From among the searched for entries, the associating unit 243 specifies two entries whose measurement times are "12:05:36" and "12:27:22". The associating unit 243 calculates the communication traffic volume "3.5" Kbytes of data exchanged between a mobile station and a base station by using wireless communication during the time period "12:05:36" to "12:27:22", i.e., when the mobile station moves from the starting point location "S1" to the end point location "E1". The associating unit 243 associates the calculated communication traffic volume "3.5" Kbytes with the diagram area "P" and stores them in the communication quality distribution managing unit 234. Furthermore, the associating unit 243 calculates the communication traffic volume density "5000" kbyte/m² by dividing the communication traffic volume "3.5" Kbytes by the physical area of the diagram area "P". The associating unit 243 associates the calculated communication traffic volume density "5000" kbyte/m² with the diagram area "P" and stores them in the communication quality distribution managing unit 234.

Figure 20:
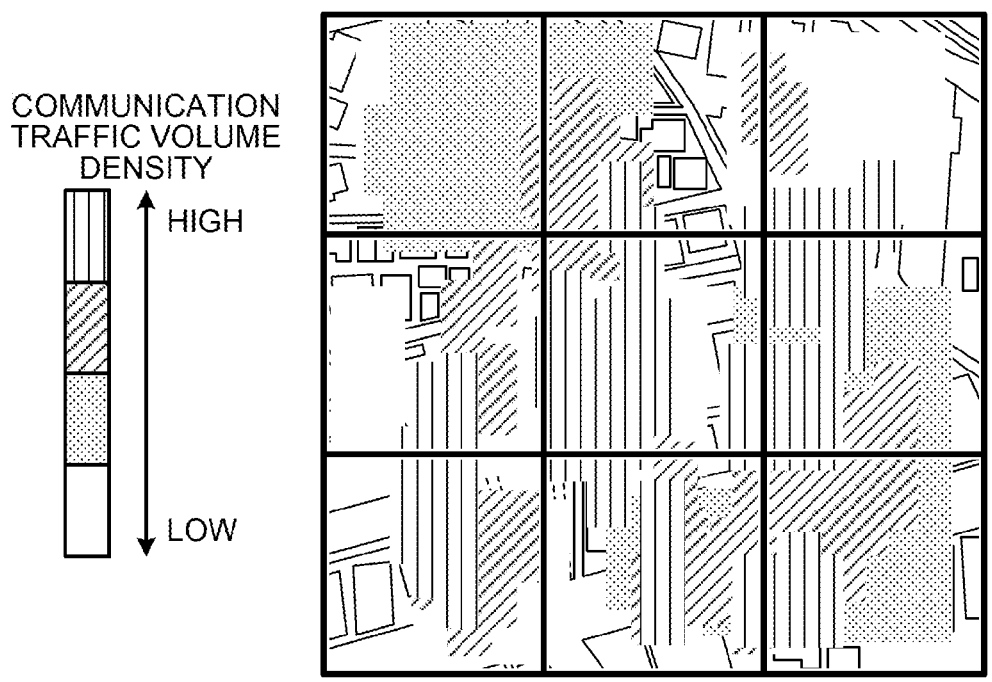
FIG. 20 is a schematic diagram illustrating an example of a display screen created by a communication quality displaying unit according to the second embodiment.

A description will be given here by referring back to FIG. 13. The communication quality displaying unit 244 creates a display screen with respect to a predetermined display unit on the basis of the information stored in the communication quality distribution managing unit 234. Specifically, the communication quality displaying unit 244 creates a display screen that is displayed on a diagram area such that the communication quality density that is associated with an identifier of a diagram area by the associating unit 243 is displayed in accordance with the magnitude of the communication quality density. FIG. 20 is a schematic diagram illustrating an example of a display screen created by a communication quality displaying unit according to the second embodiment.

For example, as illustrated in FIG. 20, the communication quality displaying unit 244 creates a display screen that is displayed in a diagram area such that the communication traffic volume density that is stored as the communication quality density in the communication quality distribution managing unit 234 is displayed by using a method in which the color changes in accordance with the magnitude of the communication traffic volume density. The method in which the color changes in accordance with the magnitude of the communication traffic volume density is, for example, a method in which a darker color is used as the magnitude of the communication volume traffic density increases.

Figure 21:
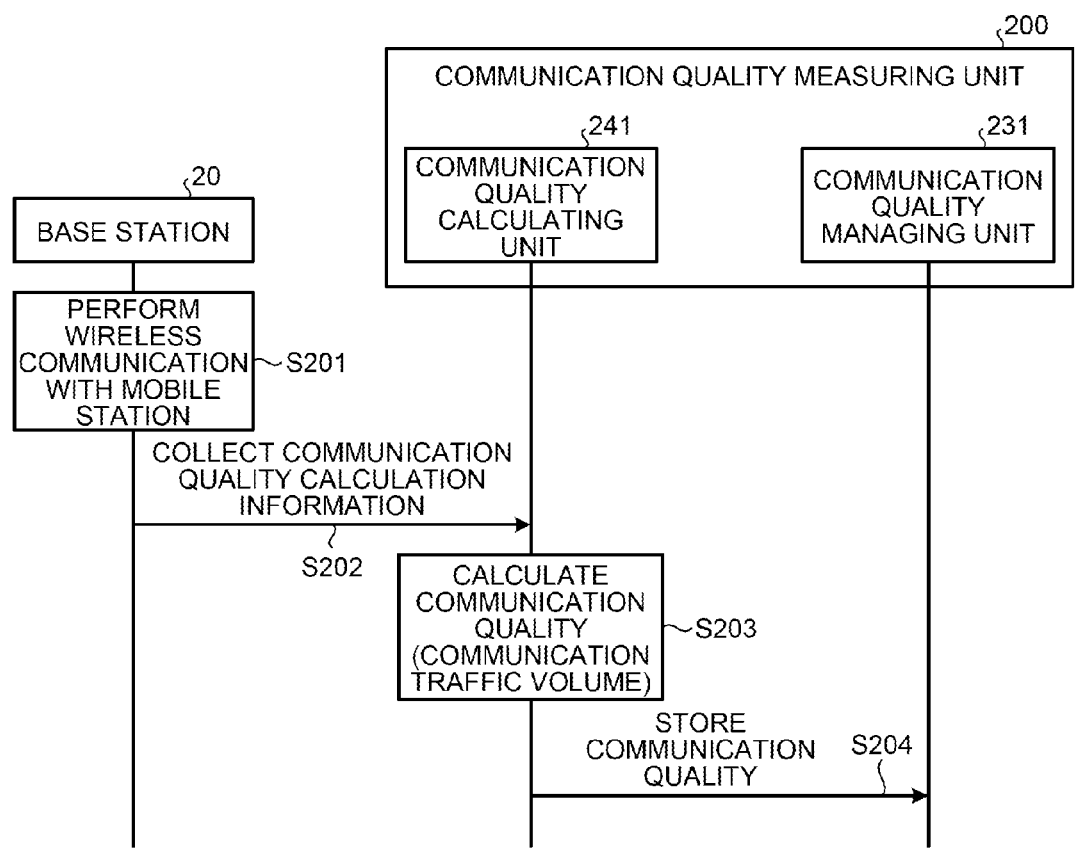
FIG. 21 is a sequence diagram illustrating the operation (performed when communication quality is calculated) of a communication system that includes a communication quality measuring apparatus according to the second embodiment.

In the following, the operation of the communication system that includes the communication quality measuring apparatus according to the second embodiment will be described. FIG. 21 is a sequence diagram illustrating the operation (performed when communication quality is calculated) of a communication system that includes a communication quality measuring apparatus according to the second embodiment.

As illustrated in FIG. 21, when wireless communication between the base station 20 and the mobile station 30 is being performed (Step S201), the communication quality calculating unit 241 in the communication quality measuring apparatus 200 collects communication quality calculation information from the base station 20 (Step S202).

By using the communication quality calculation information collected from the base station 20, the communication quality calculating unit 241 calculates the communication quality of wireless communication (Step S203). In the second embodiment, the communication quality calculating unit 241 calculates, as the communication quality of wireless communication, the communication traffic volume of data exchanged during wireless communication.

The communication quality calculating unit 241 stores, in the communication quality managing unit 231, the calculated communication traffic volume together with the current time and the identifier of the mobile station (Step S204).

Figure 22:
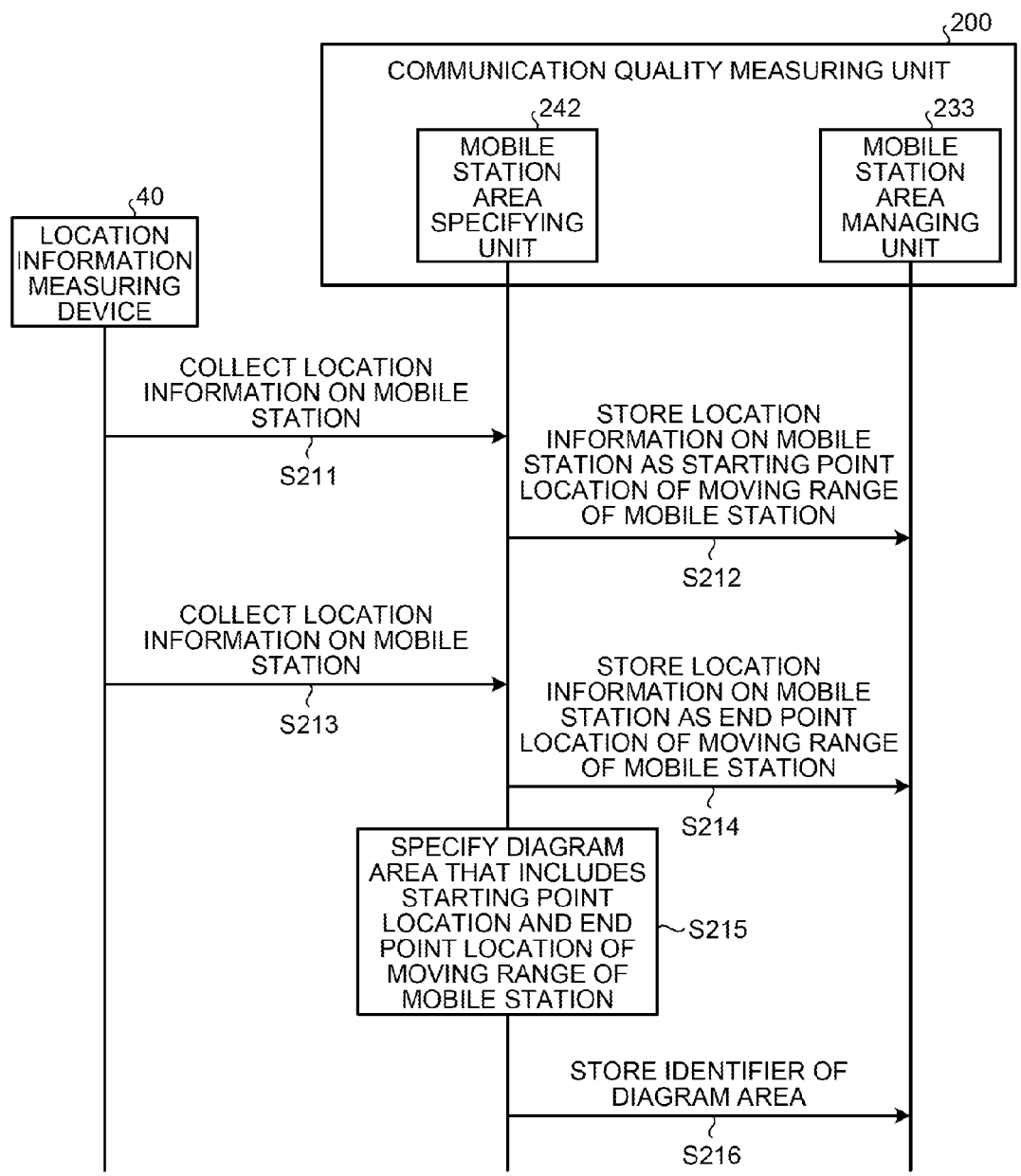
FIG. 22 is a sequence diagram illustrating the operation (performed when a mobile station area is specified) of the communication system that includes the communication quality measuring apparatus according to the second embodiment.

FIG. 22 is a sequence diagram illustrating the operation (performed when a mobile station area is specified) of the communication system that includes the communication quality measuring apparatus according to the second embodiment.

As illustrated in FIG. 22, the mobile station area specifying unit 242 in the communication quality measuring apparatus 200 collects location information on the mobile station 30 from the location information measuring device 40 (Step S211). The mobile station area specifying unit 242 stores, in the mobile station area managing unit 233, the collected location information on the mobile station 30 as the starting point location of the moving range of the mobile station (Step S212).

Then, the mobile station area specifying unit 242 again collects location information on the mobile station 30 from the location information measuring device 40 (Step S213). The mobile station area specifying unit 242 stores, in the mobile station area managing unit 233, the collected location information on the mobile station 30 as the end point location of the moving range of the mobile station (Step S214).

Subsequently, the mobile station area specifying unit 242 creates a diagram area that includes the starting point location and the end point location of the moving range of the mobile station and specifies the created diagram area as a mobile station area (Step S215). The mobile station area specifying unit 242 stores the identifier of the specified diagram area in the mobile station area managing unit 233 (Step S216).

Figure 23:
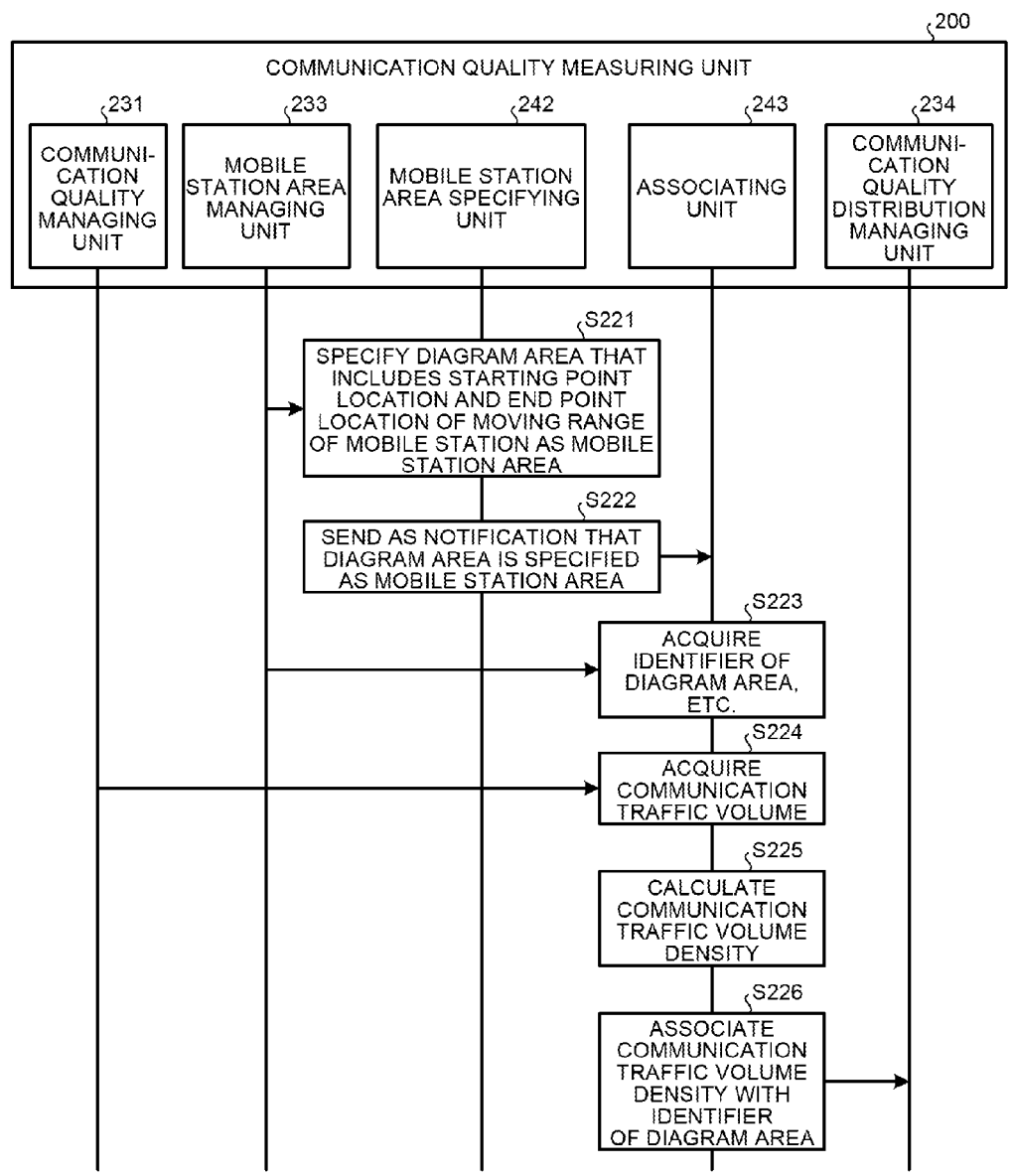
FIG. 23 is a sequence diagram illustrating the operation (at the time of an associating process) of the communication system that includes the communication quality measuring apparatus according to the second embodiment.

FIG. 23 is a sequence diagram illustrating the operation (at the time of an associating process) of the communication system that includes the communication quality measuring apparatus according to the second embodiment.

As illustrated in FIG. 23, the mobile station area specifying unit 242 in the communication quality measuring apparatus 200 refers to the mobile station area managing unit 233 and specifies the diagram area that includes the starting point location and the end point location of the moving range of the mobile station as a mobile station area (Step S221). The mobile station area specifying unit 242 notifies the associating unit 243 that the diagram area that includes the starting point location and the end point location of the moving range of the mobile station is specified as the mobile station area (Step S222).

The associating unit 243 receives, from the mobile station area specifying unit 242, a notification that the diagram area that includes the starting point location and the end point location of the moving range of the mobile station has been specified as the mobile station area. The associating unit 243 performs the following process, which is triggered when the notification has been received. Namely, the associating unit 243 refers to the mobile station area managing unit 233 and then acquires the identifier of the diagram area, the mobile station identifier associated with the starting point location and the end point location included in the diagram area, and the consecutive measurement times (Step S223).

Subsequently, the associating unit 243 acquires the communication traffic volume from the communication quality managing unit 231 (Step S224). Specifically, the associating unit 243 refers to the communication quality managing unit 231, searches for entries that match the mobile station identifier acquired from the mobile station area managing unit 233, and specifies, from the searched for entries, two entries that match the consecutive measurement times. The associating unit 243 calculates (acquires) the communication traffic volume of data exchanged between a mobile station and a base station by using wireless communication during a time period in which the mobile station moves from the starting point location to the end point location.

Then, the associating unit 243 calculates the communication traffic volume density by dividing the communication traffic volume acquired at Step S224 by the physical area of the diagram area (Step S225).

Subsequently, the associating unit 243 associates the communication traffic volume density calculated at Step S225 with the identifier of the diagram area acquired at Step S223 and then stores them in the communication quality distribution managing unit 234 (Step S226).

As described above, according to the second embodiment, in the communication quality measuring apparatus 200, the mobile station area specifying unit 242 specifies a diagram area that includes the starting point location and the end point location of the moving range of a mobile station as a mobile station area. The associating unit 243 associates the communication quality with the identifier of the diagram area that has been specified as the mobile station area. By doing so, it is possible to manage the local communication quality in accordance with the movement of a mobile station. Consequently, the communication quality for each area in which a mobile station is located can further be accurately measured. This makes it possible for a user of the communication quality measuring apparatus 200 to locally improve the communication quality for each area in which a mobile station is located.

Figure 24:
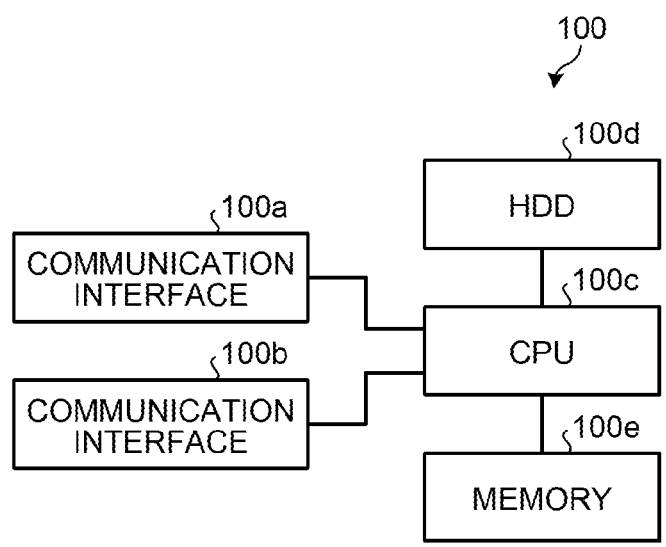
FIG. 24 is a schematic diagram illustrating an example configuration of hardware of the communication quality measuring apparatus.

The communication quality measuring apparatus 100 and 200 according to the first and the second embodiments can be implemented by the hardware configuration described below. FIG. 24 is a schematic diagram illustrating an example configuration of hardware of the communication quality measuring apparatus. The communication quality measuring apparatus 100 and 200 are implemented, as hardware, by the communication quality measuring apparatus 100 illustrated in FIG. 24. Specifically, as illustrated in FIG. 24, the communication quality measuring apparatus 100 includes a communication interface 100a, a communication interface 100b, a central processing unit (CPU) 100c, a hard disk drive (HDD) 100d, and a memory 100e. The memory 100e is formed by, for example, a ROM, a flash memory, and a RAM such as an SDRAM. The base station communication I/F unit 110 and the location information measuring device communication I/F unit 120 are implemented by the communication interface 100a and the communication interface 100b, respectively. The control units 140 and 240 are implemented by, for example, the CPU 100c. The storing units 130 and 230 are implemented by, for example, the CPU 100c and the HDD 100d.

The various processes described in the above embodiments may also be implemented by programs prepared in advance and executed by the CPU 100c. Specifically, the programs associated with the processes executed by the control units 140 and 240 are stored in advance in the HDD 100d or the memory 100e and are read to the CPU 100c, where the programs function as processes. Furthermore, each of the programs does not always need to be stored in advance in the HDD 100d or the memory 100e. Specifically, the programs may also be stored in advance in a portable recording medium, such as a flexible disk (FD), a CD-ROM, a DVD disk, a magneto-optic disk, an IC CARD, a memory card, or the like that can be inserted into the communication quality measuring apparatus 100 and read to a CPU 10b, where the programs function as processes. Furthermore, the programs may also be stored in advance in a computer or a server that is connected to the communication quality measuring apparatus 100 via, for example, the Internet, a LAN, a WAN, or the like by using a wireless or wired connection and be read to the CPU 100c, where the programs function as processes.

According to an aspect of an embodiment of the communication quality measuring apparatus disclosed in the present invention, an advantage is provided in that it is possible to precisely measure the communication quality for each area in which a mobile station is located while avoiding an increase in the processing load placed on the mobile station.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication quality measuring apparatus comprising:
- a memory; and
- a processor coupled to the memory, wherein
- the processor executes a process comprising:
  - collecting, from a base station that performs wireless communication with a mobile station, information used to calculate communication quality of the wireless communication and calculating the communication quality by using the information;
  - collecting location information from a measuring device, which measures the location information related to the mobile station, and specifying, by using the location information, a mobile station area that is an area in which the mobile station is located; and
  - associating the communication quality calculated at the calculating with each of the mobile station areas specified at the specifying, wherein
  - the specifying includes further collecting, from the measuring device, a measurement time of the location information and specifying, as the mobile station area, a rectangular area that includes two pieces of the location information that are related to the same mobile station and whose measurement times are consecutive as a starting point location and an end point location of a moving range of the mobile station, the starting point location and the end point location of the moving range of the mobile station being midpoint locations of two opposing sides in the rectangular area and a length of the two opposing sides varying in accordance with a distance between the starting point location and the end point location.

2. The communication quality measuring apparatus according to claim 1, wherein
the associating includes associating the communication quality with an identifier of the rectangular area that is specified as the mobile station area at the specifying.

3. The communication quality measuring apparatus according to claim 1, further comprising a display unit that displays, on multiple areas on a map associated with a plurality of the mobile station areas, the communication quality associated with each of the mobile station areas at the associating.

4. The communication quality measuring apparatus according to claim 3, wherein the display unit displays communication quality density in the mobile station area in accordance with the magnitude of the communication quality density, which is a value obtained by dividing the communication quality by the physical area of the mobile station area, the communication quality being associated with each of the mobile station areas at the associating.

5. The communication quality measuring apparatus according to claim 1, further comprising a sending unit that sends the communication quality associated with each of the mobile station areas at the associating to an external device.

6. The communication quality measuring apparatus according to claim 1, wherein the communication quality is a transmission speed of data exchanged during the wireless communication or is the communication traffic volume of the data.

7. A communication quality measuring method comprising:
- collecting, from a base station that performs wireless communication with a mobile station, information used to calculate communication quality of the wireless communication, using a processor;
- calculating the communication quality by using the information, using the processor;
- collecting location information from a measuring device that measures the location information related to the mobile station, using the processor;
- specifying, by using the location information, a mobile station area that is an area in which the mobile station is located, using the processor; and
- associating the communication quality with each of the mobile station areas, using the processor, wherein
- the specifying includes further collecting, from the measuring device, a measurement time of the location information and specifying, as the mobile station area, a rectangular area that includes two pieces of the location information that are related to the same mobile station and whose measurement times are consecutive as a starting point location and an end point location of a moving range of the mobile station, the starting point location and the end point location of the moving range of the mobile station being midpoint locations of two opposing sides in the rectangular area and a length of the two opposing sides varying in accordance with a distance between the starting point location and the end point location.

* * * * *